United States Patent [19]

Carlebach

[11] Patent Number: 5,299,020
[45] Date of Patent: Mar. 29, 1994

[54] METHOD AND APPARATUS FOR GENERATING A SCREENED REPRODUCTION OF AN IMAGE USING STORED DOT PORTIONS

[75] Inventor: Ephraim A. Carlebach, Ra'anana, Israel

[73] Assignee: Scitex Corporation Ltd., Herzliya, Israel

[21] Appl. No.: 666,338

[22] Filed: Mar. 8, 1991

[51] Int. Cl.$^5$ .......................... H04N 1/40; H04N 1/23
[52] U.S. Cl. .................................. 358/298; 358/459; 358/460; 358/536
[58] Field of Search ............... 358/298, 456, 458, 459, 358/460, 536, 534

[56] References Cited

U.S. PATENT DOCUMENTS

| | | |
|---|---|---|
| 3,043,906 | 7/1962 | Hassing . |
| 3,197,558 | 7/1965 | Ernst . |
| 3,465,199 | 9/1969 | Simshauser . |
| 3,742,129 | 6/1973 | Roberts et al. . |
| 3,916,096 | 10/1975 | Everett et al. . |
| 4,040,094 | 8/1977 | Everett et al. . |
| 4,149,183 | 4/1979 | Pellar et al. . |
| 4,259,694 | 3/1981 | Liao . |
| 4,456,924 | 6/1984 | Rosenfeld . |
| 4,499,489 | 2/1985 | Gall et al. . |
| 4,688,031 | 8/1987 | Haggerty ............................ 358/459 |
| 4,825,298 | 4/1989 | Ikuta et al. . |
| 4,918,622 | 4/1990 | Granger et al. . |

FOREIGN PATENT DOCUMENTS

| | | |
|---|---|---|
| 0195563 | 9/1986 | European Pat. Off. . |
| 2157119 | 10/1985 | United Kingdom . |
| 2180427 | 3/1987 | United Kingdom . |

OTHER PUBLICATIONS

L. G. Wash & J. F. Hamilton Jr. The Design of a Graphic Arts Halftone Screening Computer. SPIE vol. 1073 Electronic Imaging Applications in Graphic Arts, pp. 26–50, 1989.

J. C. Stoffel & J. F. Moreland, A Survey of Electronic Techniques for Pictorial Image Reproduction. IEEE Transactions on Communications, vol. COM-29.(12), 1898–1925, 1981.

O. Bryngdahl, Halftone Images: Spatial Resolution and Tone Reproduction, J. Opt. Soc. Am. vol. 68 (3), 416–422, 1978.

Primary Examiner—Edward L. Coles, Jr.
Assistant Examiner—Scott A. Rogers
Attorney, Agent, or Firm—Ladas & Parry

[57] ABSTRACT

A technique for generating a screened reproduction of an image including the steps of providing a representation of an original containing information representing the input density values of the original, storing information representing only part of at least one printing dot, and exposing a recording medium to record the image by using the stored information to compose complete printing dots depending on the input densities of the representation at the location of the printing dots. Apparatus for carrying out this and other techniques is also disclosed.

29 Claims, 25 Drawing Sheets

| INPUT DENSITY | DOT UNITS | A | B | C | D |
|---|---|---|---|---|---|
| 0 - 3 | 1 | 0 | 0 | 0 | 1 |
| 4 - 7 | 2 | 0 | 1 | 0 | 1 |
| 8 - 11 | 3 | 0 | 1 | 1 | 1 |
| 12 - 15 | 4 | 1 | 1 | 1 | 1 |
| 16 - 19 | 5 | 1 | 0 | 1 | 3 |
| 20 - 23 | 6 | 1 | 0 | 2 | 3 |
| 24 - 27 | 7 | 1 | 0 | 3 | 3 |
| 28 - 31 | 8 | 1 | 1 | 3 | 3 |
| 32 - 35 | 9 | 3 | 1 | 2 | 3 |
| 36 - 39 | 10 | 3 | 1 | 3 | 3 |
| 40 - 43 | 11 | 3 | 2 | 3 | 3 |
| 44 - 47 | 12 | 3 | 3 | 3 | 3 |
| 48 - 51 | 13 | 3 | 1 | 3 | 6 |
| 52 - 54 | 14 | 3 | 3 | 3 | 5 |
| 56 - 59 | 15 | 3 | 3 | 3 | 6 |
| 60 - 63 | 16 | 5 | 3 | 3 | 5 |
| 64 - 67 | 17 | 5 | 3 | 3 | 6 |
| 68 - 71 | 18 | 6 | 3 | 3 | 6 |
| 72 - 75 | 19 | 3 | 4 | 6 | 6 |
| 76 - 79 | 20 | 3 | 5 | 6 | 6 |
| 80 - 83 | 21 | 6 | 3 | 6 | 6 |
| 84 - 87 | 22 | 6 | 5 | 5 | 6 |
| 88 - 91 | 23 | 5 | 6 | 6 | 6 |
| 92 - 95 | 24 | 6 | 6 | 6 | 6 |
| 96 - 99 | 25 | 6 | 3 | 6 | 10 |
| 100 - 103 | 26 | 6 | 5 | 6 | 9 |
| 104 - 107 | 27 | 6 | 6 | 6 | 9 |
| 108 - 111 | 28 | 6 | 6 | 6 | 10 |
| 112 - 115 | 29 | 8 | 6 | 6 | 9 |
| 116 - 119 | 30 | 9 | 6 | 6 | 9 |
| 120 - 123 | 31 | 9 | 6 | 6 | 10 |
| 124 - 127 | 32 | 10 | 6 | 6 | 10 |

FIG. 7A1

| INPUT DENSITY | DOT UNITS | A | B | C | D |
|---|---|---|---|---|---|
| 128 - 131 | 33 | 9 | 6 | 9 | 9 |
| 132 - 135 | 34 | 9 | 6 | 9 | 10 |
| 136 - 139 | 35 | 9 | 6 | 10 | 10 |
| 140 - 143 | 36 | 10 | 6 | 10 | 10 |
| 144 - 147 | 37 | 9 | 9 | 9 | 10 |
| 148 - 151 | 38 | 10 | 9 | 9 | 10 |
| 152 - 155 | 39 | 10 | 10 | 9 | 10 |
| 156 - 159 | 40 | 10 | 10 | 10 | 10 |
| 160 - 163 | 41 | 10 | 10 | 10 | 11 |
| 164 - 167 | 42 | 10 | 11 | 10 | 11 |
| 168 - 171 | 43 | 10 | 11 | 11 | 11 |
| 172 - 175 | 44 | 11 | 11 | 11 | 11 |
| 176 - 179 | 45 | 11 | 11 | 11 | 12 |
| 180 - 183 | 46 | 11 | 11 | 12 | 12 |
| 184 - 187 | 47 | 11 | 12 | 12 | 12 |
| 188 - 191 | 48 | 12 | 12 | 12 | 12 |
| 192 - 195 | 49 | 12 | 12 | 12 | 13 |
| 196 - 199 | 50 | 12 | 12 | 13 | 13 |
| 200 - 203 | 51 | 12 | 13 | 13 | 13 |
| 204 - 207 | 52 | 13 | 13 | 13 | 13 |
| 208 - 211 | 53 | 13 | 13 | 13 | 14 |
| 212 - 215 | 54 | 13 | 14 | 13 | 14 |
| 216 - 219 | 55 | 13 | 14 | 14 | 14 |
| 220 - 223 | 56 | 14 | 14 | 14 | 14 |
| 224 - 227 | 57 | 14 | 14 | 14 | 15 |
| 228 - 231 | 58 | 14 | 14 | 15 | 15 |
| 232 - 235 | 59 | 14 | 15 | 15 | 15 |
| 236 - 239 | 60 | 15 | 15 | 15 | 15 |
| 240 - 243 | 61 | 15 | 15 | 15 | 16 |
| 244 - 247 | 62 | 15 | 16 | 15 | 16 |
| 248 - 251 | 63 | 15 | 16 | 16 | 16 |
| 252 - 255 | 64 | 16 | 16 | 16 | 16 |

FIG. 7A2

| X | Y | Nmin |
|---|---|---|
| 0 | 0 | 1 |
| 1 | 0 | 2 |
| 2 | 0 | 5 |
| 3 | 0 | 9 |
| 0 | 1 | 3 |
| 1 | 1 | 4 |
| 2 | 1 | 7 |
| 3 | 1 | 12 |
| 0 | 2 | 6 |
| 1 | 2 | 8 |
| 2 | 2 | 11 |
| 3 | 2 | 14 |
| 0 | 3 | 10 |
| 1 | 3 | 13 |
| 2 | 3 | 15 |
| 3 | 3 | 16 |

FIG. 7B

| INPUT DENSITY | DOT UNITS IN SUPERDOT | DOT UNITS IN EACH MODULAR PORTION | |
|---|---|---|---|
| | | I/III | II/IV |
| 0 - 1 | 2 | 1 | 0 |
| 2 - 3 | 4 | 1 | 1 |
| 4 - 5 | 6 | 2 | 1 |
| 6 - 7 | 8 | 2 | 2 |
| 8 - 9 | 10 | 3 | 2 |
| 10 - 11 | 12 | 3 | 3 |
| 12 - 13 | 14 | 4 | 3 |
| 14 - 15 | 16 | 4 | 4 |
| 16 - 17 | 18 | 5 | 4 |
| 18 - 19 | 20 | 5 | 5 |
| 20 - 21 | 22 | 6 | 5 |
| 22 - 23 | 24 | 6 | 6 |
| 24 - 25 | 26 | 7 | 6 |
| 26 - 27 | 28 | 7 | 7 |
| 28 - 29 | 30 | 8 | 7 |
| 30 - 31 | 32 | 8 | 8 |
| 32 - 33 | 34 | 9 | 8 |
| 34 - 35 | 36 | 9 | 9 |
| 36 - 37 | 38 | 10 | 9 |
| 38 - 39 | 40 | 10 | 10 |
| 40 - 41 | 42 | 11 | 10 |
| 42 - 43 | 44 | 11 | 11 |
| 44 - 45 | 46 | 12 | 11 |
| 46 - 47 | 48 | 12 | 12 |
| 48 - 49 | 50 | 13 | 12 |
| 50 - 51 | 52 | 13 | 13 |
| 52 - 53 | 54 | 14 | 13 |
| 54 - 55 | 56 | 14 | 14 |
| 56 - 57 | 58 | 15 | 14 |
| 58 - 59 | 60 | 15 | 15 |
| 60 - 61 | 62 | 16 | 15 |
| 62 - 63 | 64 | 16 | 16 |

FIG. 12/1A

| INPUT DENSITY | DOT UNITS IN SUPERDOT | DOT UNITS IN EACH MODULAR PORTION | |
|---|---|---|---|
| | | I/III | II/IV |
| 64 - 65 | 66 | 17 | 16 |
| 66 - 67 | 68 | 17 | 17 |
| 68 - 69 | 70 | 18 | 17 |
| 70 - 71 | 72 | 18 | 18 |
| 72 - 73 | 74 | 19 | 18 |
| 74 - 75 | 76 | 19 | 19 |
| 76 - 77 | 78 | 20 | 19 |
| 78 - 79 | 80 | 20 | 20 |
| 80 - 81 | 82 | 21 | 20 |
| 82 - 83 | 84 | 21 | 21 |
| 84 - 85 | 86 | 22 | 21 |
| 86 - 87 | 88 | 22 | 22 |
| 88 - 89 | 90 | 23 | 22 |
| 90 - 91 | 92 | 23 | 23 |
| 92 - 93 | 94 | 24 | 23 |
| 94 - 95 | 96 | 24 | 24 |
| 96 - 97 | 98 | 25 | 24 |
| 98 - 99 | 100 | 25 | 25 |
| 100 - 101 | 102 | 26 | 25 |
| 102 - 103 | 104 | 26 | 26 |
| 104 - 105 | 106 | 27 | 26 |
| 106 - 107 | 108 | 27 | 27 |
| 108 - 109 | 110 | 28 | 27 |
| 110 - 111 | 112 | 28 | 28 |
| 112 - 113 | 114 | 29 | 28 |
| 114 - 115 | 116 | 29 | 29 |
| 116 - 117 | 118 | 30 | 29 |
| 118 - 119 | 120 | 30 | 30 |
| 120 - 121 | 122 | 31 | 30 |
| 122 - 123 | 124 | 31 | 31 |
| 124 - 125 | 126 | 32 | 31 |
| 126 - 127 | 128 | 32 | 32 |

FIG. 12/1B

| INPUT DENSITY | DOT UNITS IN SUPERDOT | DOT UNITS IN EACH MODULAR PORTION | |
|---|---|---|---|
| | | I/III | II/IV |
| 128 - 129 | 130 | 33 | 32 |
| 130 - 131 | 132 | 33 | 33 |
| 132 - 133 | 134 | 34 | 33 |
| 134 - 135 | 136 | 34 | 34 |
| 136 - 137 | 138 | 35 | 34 |
| 138 - 139 | 140 | 35 | 35 |
| 140 - 141 | 142 | 36 | 35 |
| 142 - 143 | 144 | 36 | 36 |
| 144 - 145 | 146 | 37 | 36 |
| 146 - 147 | 148 | 37 | 37 |
| 148 - 149 | 150 | 38 | 37 |
| 150 - 151 | 152 | 38 | 38 |
| 152 - 153 | 154 | 39 | 38 |
| 154 - 155 | 156 | 39 | 39 |
| 156 - 157 | 158 | 40 | 39 |
| 158 - 159 | 160 | 40 | 40 |
| 160 - 161 | 162 | 41 | 40 |
| 162 - 163 | 164 | 41 | 41 |
| 164 - 165 | 166 | 42 | 41 |
| 166 - 167 | 168 | 42 | 42 |
| 168 - 169 | 170 | 43 | 42 |
| 170 - 171 | 172 | 43 | 43 |
| 172 - 173 | 174 | 44 | 43 |
| 174 - 175 | 176 | 44 | 44 |
| 176 - 177 | 178 | 45 | 44 |
| 178 - 179 | 180 | 45 | 45 |
| 180 - 181 | 182 | 46 | 45 |
| 182 - 183 | 184 | 46 | 46 |
| 184 - 185 | 186 | 47 | 46 |
| 186 - 187 | 188 | 47 | 47 |
| 188 - 189 | 190 | 48 | 47 |
| 190 - 191 | 192 | 48 | 48 |

FIG. 12/2A

| INPUT DENSITY | DOT UNITS IN SUPERDOT | DOT UNITS IN EACH MODULAR PORTION | |
|---|---|---|---|
| | | I/III | II/IV |
| 192 - 193 | 194 | 49 | 48 |
| 194 - 195 | 196 | 49 | 49 |
| 196 - 197 | 198 | 50 | 49 |
| 198 - 199 | 200 | 50 | 50 |
| 200 - 201 | 202 | 51 | 50 |
| 202 - 203 | 204 | 51 | 51 |
| 204 - 205 | 206 | 52 | 51 |
| 206 - 207 | 208 | 52 | 52 |
| 208 - 209 | 210 | 53 | 52 |
| 210 - 211 | 212 | 53 | 53 |
| 212 - 213 | 214 | 54 | 53 |
| 214 - 215 | 216 | 54 | 54 |
| 216 - 217 | 218 | 55 | 54 |
| 218 - 219 | 220 | 55 | 55 |
| 220 - 221 | 222 | 56 | 55 |
| 222 - 223 | 224 | 56 | 56 |
| 224 - 225 | 226 | 57 | 56 |
| 226 - 227 | 228 | 57 | 57 |
| 228 - 229 | 230 | 58 | 57 |
| 230 - 231 | 232 | 58 | 58 |
| 232 - 233 | 234 | 59 | 58 |
| 234 - 235 | 236 | 59 | 59 |
| 236 - 237 | 238 | 60 | 59 |
| 238 - 239 | 240 | 60 | 60 |
| 240 - 241 | 242 | 61 | 60 |
| 242 - 243 | 244 | 61 | 61 |
| 244 - 245 | 246 | 62 | 61 |
| 246 - 247 | 248 | 62 | 62 |
| 248 - 249 | 250 | 63 | 62 |
| 250 - 251 | 252 | 63 | 63 |
| 252 - 253 | 254 | 64 | 63 |
| 254 - 255 | 256 | 64 | 64 |

FIG. 12/2B

METHOD AND APPARATUS FOR GENERATING A SCREENED REPRODUCTION OF AN IMAGE USING STORED DOT PORTIONS

FIELD OF THE INVENTION

The present invention relates to the recording of a halftone picture and more particularly to a method and apparatus for electronic halftone dot generation in image reproduction.

BACKGROUND OF THE INVENTION

Electronic screening for image reproduction is well established in the art. According to a well known technique described in U.S. Pat. No. 4,456,924 of the present assignee, for each screened dot, a multiplicity of coordinates of a laser plotter are translated into screen-cell coordinates. A corresponding cell memory is preloaded with threshold values, defining a cell memory matrix. Input digitized scanned density values of an image, such as a color separation, are compared with the threshold values, cell by cell. The results provide an on/off control input for a laser plotter.

U.S. Pat. No. 4,825,298 to Ikuta and Murai describes a technique for generating a screened reproduction of an image in which the density distribution of a given screen dot is expressed in three dimensions, wherein the area of the screen dot is expressed along X and Y axes and the density is expressed along a Z axis perpendicular thereto. A film coordinate generator generates film coordinates (u,v), corresponding to the position of an exposure beam on a recording film which position is detected by encoders. The film coordinates are in turn supplied to a screen coordinate generator to be converted into virtual screen coordinates (x,y). A beam control signal generator receives the coordinates (x,y) and an image signal corresponding to the position of the exposure beam to output a beam control signal indicting lighting of the exposure beam when one of the coordinates (x,y) is between upper and lower limit values, corresponding to the same, which are previously determined for each combination of the other of the coordinates (x,y) and the density value of the image signal.

The technique of U.S. Pat. No. 4,825,298 to Ikuta and Murai has the disadvantage that its memory requirements are high.

U.K. Published Patent Application 2,157,119A to Ikuta describes apparatus which operates similarly to the technique of U.S. Pat. No. 4,456,924 but does not employ a matrix memory. Instead, the threshold function is calculated on the fly in real time or near real time. This apparatus is limited to relatively simple dot configurations.

In U.S. Pat. No. 4,918,622 there is described an electronic graphic arts screener in which a three-dimensional memory array is employed for screen dot generation.

Conventional techniques for screen dot generation, exemplified by that described in U.S. Pat. No. 4,456,924 represent each input density level by a screen dot of a corresponding number of dot elements. The difference between a relatively lower input density and a relatively higher input density is indicated by adding predetermined additional dot elements at predetermined locations to those dot elements at predetermined locations which represent the lower input density. Thus the set of dot elements which makes up a relatively higher input density dot always includes the subset of the dot elements which makes up a relatively lower input density dot.

The foregoing arrangement does not always provide a best fit to a chosen screen dot shape for a given input density.

SUMMARY OF THE INVENTION

The present invention seeks to provide an improved technique for generating a screened reproduction of an image.

There is thus provided in accordance with a preferred embodiment of the present invention a technique for generating a screened reproduction of an image comprising the steps of:

providing a representation of an original containing information representing the input density values of the original;

storing information representing a part of at least one printing dot; and exposing a recording medium to record the image by using the stored information to compose complete printing dots depending on the input densities of the representation at the locations of the printing dots.

For the purposes of clarity in expression and understanding the following nomenclature is used throughout the specification and claims:

"Printing dot" refers to an actual printing dot produced by a laser plotter, which printing dot is made up of a plurality of individual printing dot elements, individually exposed by the laser plotter from among a plurality of potential printing dot elements, which, if all exposed, would produce a printing dot having a dot percentage of 100.

"Part of a printing dot" refers to less than a complete printing dot. The smallest part of a printing dot contains a single printing dot element.

"Dot units" refer to spatial units or, when appropriate, to addressable representations thereof in memory space which are related to potential printing dot elements through various coordinate transformations, here termed screen transformations, which may involve rotation and scaling.

"Dot section" refers to a plurality of dot units, normally being less than the total of dot units required to define a complete printing dot.

"Dot portion" refers to a collection of dot units which corresponds to part of a printing dot. No more than a single dot portion is contained within a single dot section.

"Virtual printing dot" refers to a plurality of dot portions which together correspond to a complete printing dot.

Further in accordance with an embodiment of the invention, the step of storing includes storing information representing only part of at least one printing dot.

Further in accordance with an embodiment of the invention, the step of storing includes storing information representing less than complete printing dots.

Additionally in accordance with an embodiment of the present invention, the step of storing includes storing information representing part of a printing dot in a first look-up table which comprises representations of a plurality of dot units making up a dot section, wherein each representation of a dot unit is assigned an identification code used for indicating whether that particular dot unit will correspond to a printing dot element.

Additionally in accordance with an embodiment of the invention, the identification code indicates the smallest number of dot units which must be contained in a chosen dot portion in order for that particular dot unit to form part of that dot portion.

Further in accordance with an embodiment of the invention, the step of exposing comprises:

supplying area location information to the first look-up table and to a second look up table, wherein the second look-up table receives a portion of the area location information which identifies a given dot section location as well as input density information and provides an output indicating the total number of dot units that would be contained in the corresponding dot portion, were the same input density to be present over the entire dot section, and the first look-up table receives a portion of the area location information which indicates the location of a dot unit in the dot section and provides the identification code of the corresponding dot unit;

supplying the outputs of the first and second look-up tables to a comparator which indicates for each dot unit whether that dot unit is included in the total number of dot units forming the dot portion; and exposing only printing dot elements which correspond to the dot units forming the dot portion.

In accordance with a preferred embodiment of the invention, the step of storing comprises the provision of a look-up table containing, for each combination of a given dot section location and a given input density, the total number of dot units that would be contained in the corresponding dot portion, were the same input density to be present over the entire dot section.

Alternatively in accordance with an embodiment of the invention, the step of exposing comprises:

supplying to a look-up table area location information identifying a given dot section location, as well as corresponding input density information and providing an output from the look-up table relating to the total number of dot units that are included in a dot portion;

using the output of the look-up table and information relating to the location of a dot unit in the dot section to indicate for each dot unit whether that dot unit is included in the total number of dot units forming the dot portion; and exposing only those printing dot elements which correspond to the dot units in the dot portion;

Each dot unit may correspond to a single potential printing dot element. Alternatively each dot unit may correspond to a plurality of potential printing dot elements. More generally, any number of dot units may correspond to any number of potential printing dot elements.

In accordance with a preferred embodiment of the present invention, the printing dot for a relatively higher input density does not always include all of the printing dot elements of a printing dot for a relatively lower input density.

A printing dot may comprise multiple dots or more generally multiple areas. The step of storing may comprise storing of only parts of each of such multiple areas. The multiple areas may be mutually non-contacting.

There is additionally provided apparatus for carrying out the foregoing techniques.

BRIEF DESCRIPTION OF THE DRAWINGS

The present invention will be more fully understood and appreciated from the following detailed description, taken in conjunction with the drawings in which:

FIGS. 7A1-2 and 7B are illustrations of look-up tables which store information defining virtual printing dots for each input density for a given type of printing dot configuration of which the virtual printing dot illustrated in FIG. 6 is an exemplary representation;

FIGS. 1212-1A-1B, and 12-2A-2B is an illustration of a look-up table which stores part of the information defining virtual printing superdots for each input density value for a given type of printing superdot configuration of which the virtual printing superdot illustrated in FIG. 11 is an exemplary representation;

DETAILED DESCRIPTION OF A PREFERRED EMBODIMENT

Figure 1:
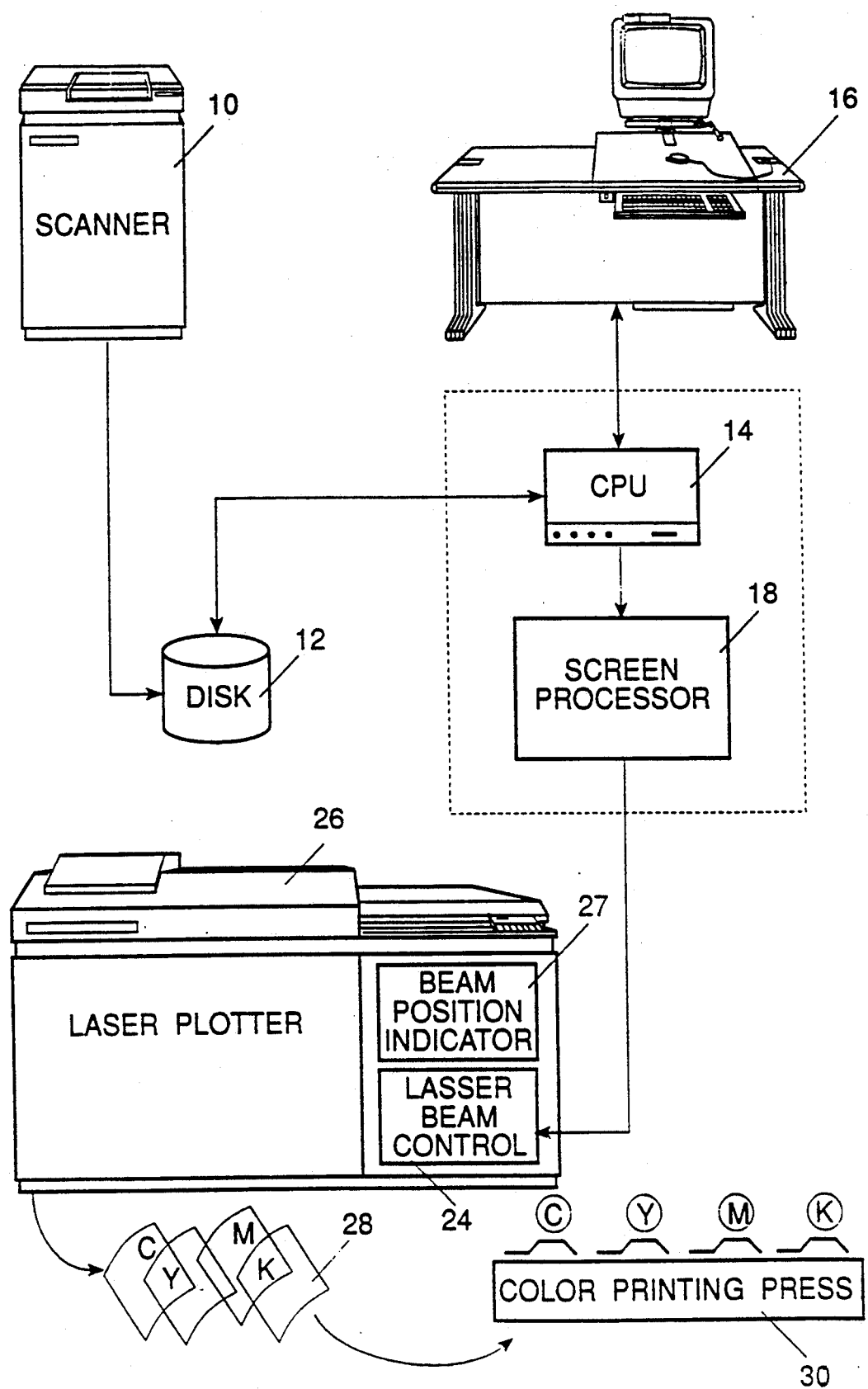
FIG. 1 is a simplified block diagram illustration of a process color printing system constructed and operative in accordance with a preferred embodiment of the present invention.

Reference is now made to FIG. 1, which illustrates a system for generating a screened reproduction of an image constructed and operative in accordance with a preferred embodiment of the present invention. The system preferably comprises a color separation scanner 10, such as a Scitex Smart Scanner, manufactured and sold by Scitex Corporation Ltd. of Herzlia, Israel, which is adapted to provide a digital color separation output of a color original.

The digital output of scanner 10 is normally stored on an image data disk 12 or any other suitable storage medium, which is accessible by a CPU 14, such as an Intel 80386. Interfacing with the CPU 14 is an interactive workstation 16, such as a Scitex Prisma, manufactured and sold by Scitex Corporation Ltd. of Herzlia, Israel.

CPU 14 also interfaces with screen processor circuitry 18 which provides a control output to laser beam control circuitry 24 in a laser plotter 26, such as a Raystar, manufactured and sold by Scitex Corporation Ltd. of Herzlia, Israel. The laser plotter 26 includes beam position indicator apparatus 27, which provides an output to screen processor 18.

Laser plotter 26 produces halftone film color separations 28 which are employed in a conventional process color printing press 30, to produce process color prints.

Screen control circuitry 18 is illustrated in greater detail in FIGS. 9, 10, 14 and 15 and will be described hereinbelow.

Figure 2:
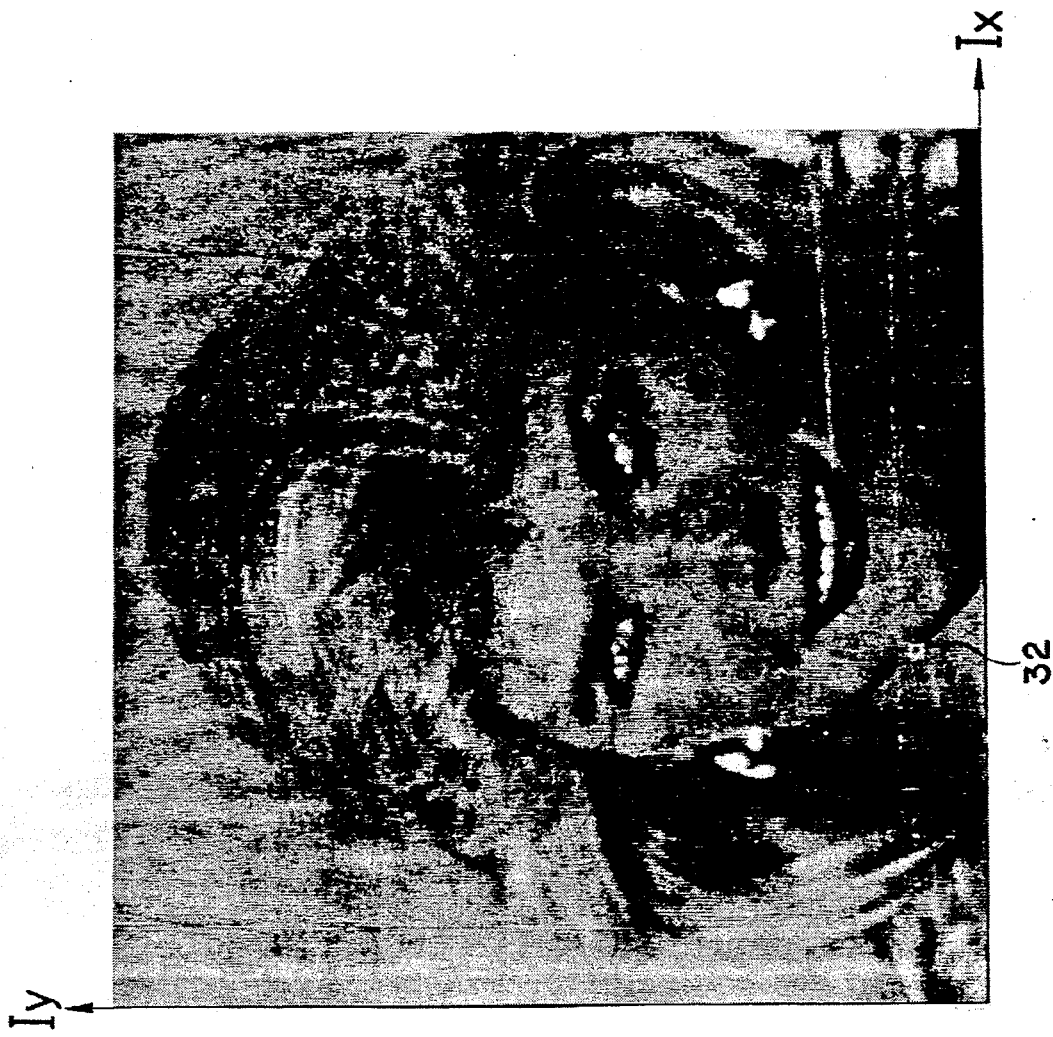
FIG. 2 is an illustration of a typical halftone color separation.
Figure 3:
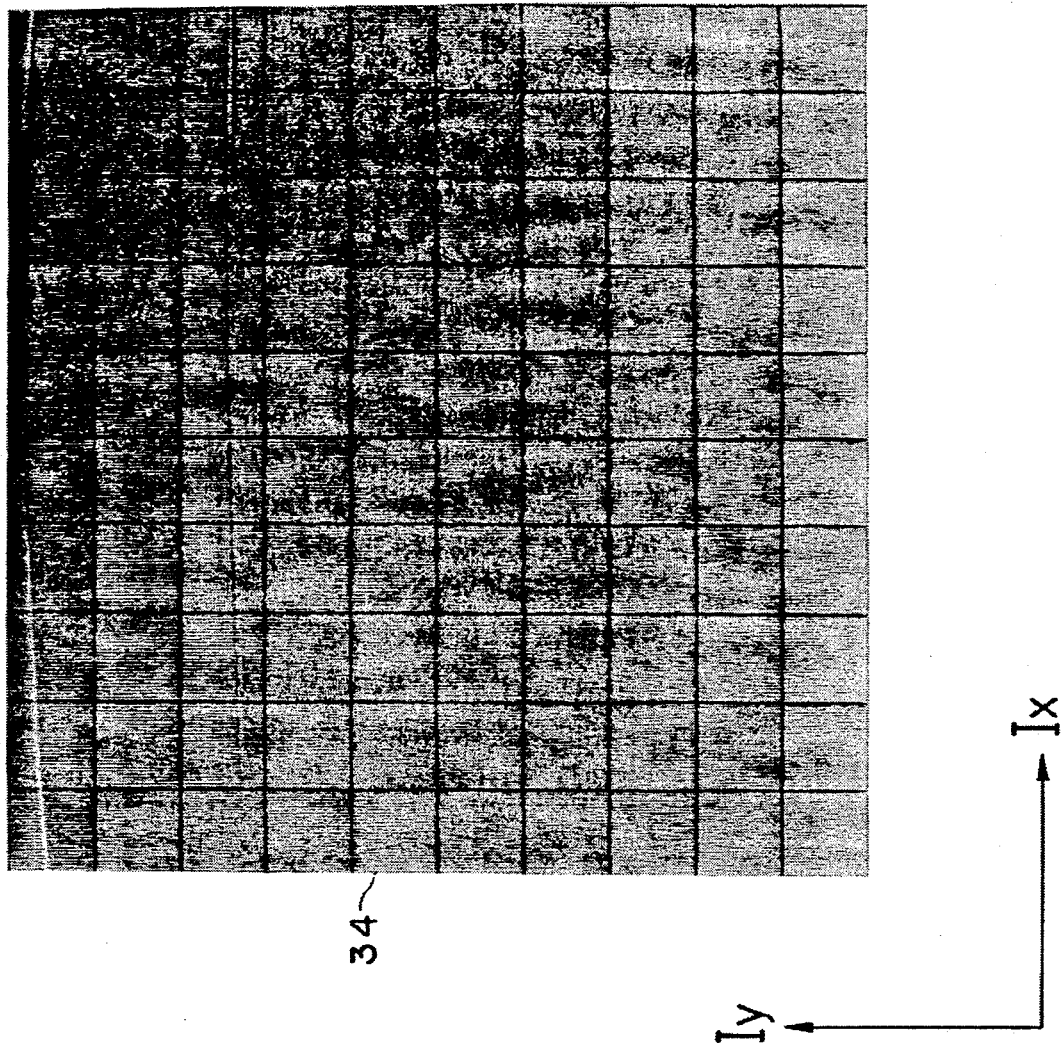
FIG. 3 is an enlarged illustration of a small portion of the halftone color separation of FIG. 2.

Reference is now made to FIGS. 2 and 3. FIG. 2 illustrates a typical halftone color separation which is stored on disk 12. FIG. 3 illustrates in enlarged detail, a small area 32 indicated on FIG. 2. It is noted that the gray level over area 32 varies thereacross.

The halftone color separation in general and the small area 32 in particular are hereinafter termed the input image and are divided into a first multiplicity of pixels 34 which are arranged along coordinates $I_x$ and $I_y$. Pixels 34 typically have a resolution of 100–400 pixels per inch along each of the coordinate axes of the input image.

Figure 4:
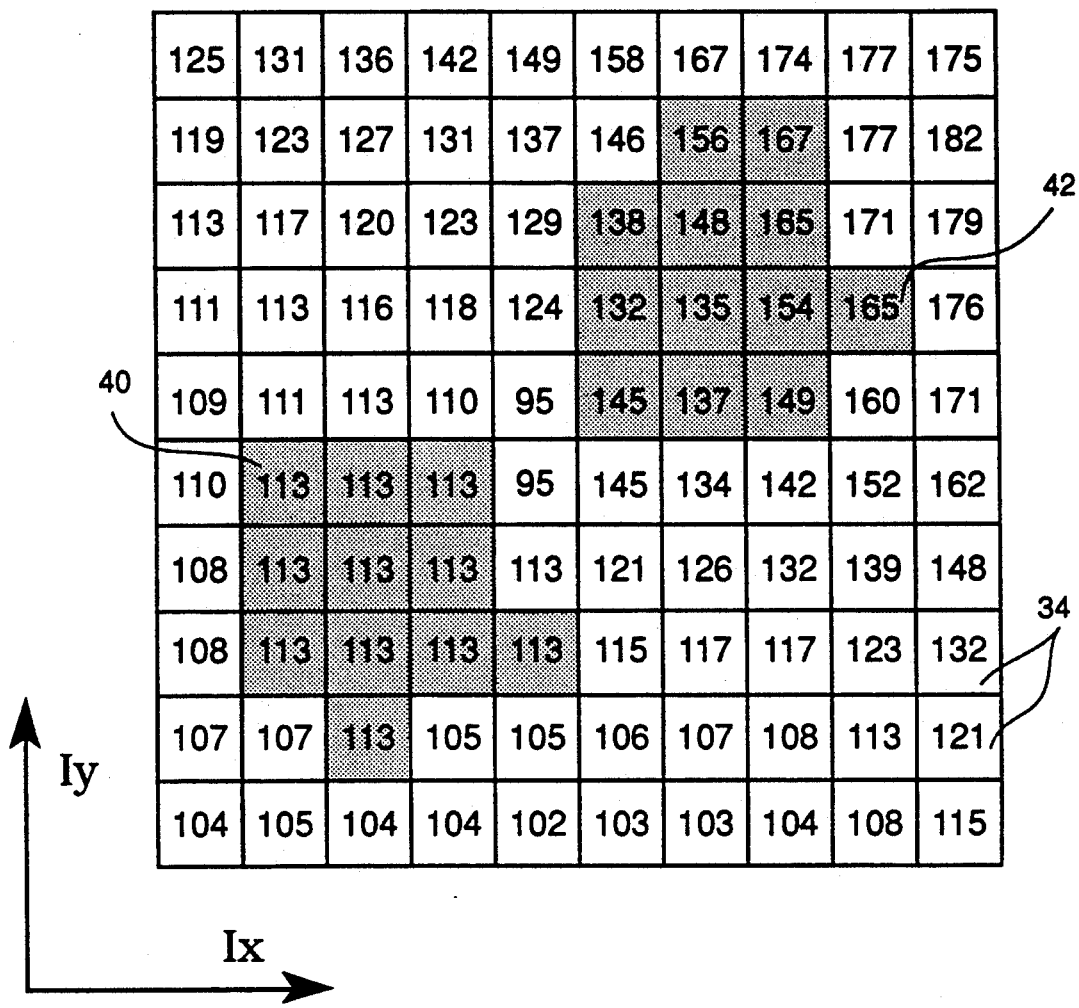
FIG. 4 is an illustration of pixel-by-pixel input density values for the small portion of the color separation shown in FIG. 3.

Each average gray level for a pixel 34 is represented digitally by an input density level. There are typically provided 256 different input density levels, 0 being the lightest and 255 being the blackest. FIG. 4 illustrates the input density values for the pixels 34 of FIG. 3.

One preferred embodiment of the present invention is characterized in that, in contrast to the prior art, it employs inter-section distribution and intra-section composition information for each of 256 input density values. The inter-section distribution and intra-section composition information is preferably stored in look-up tables forming part of screen processor 18 (FIG. 1). The inter-section distribution and intra-section composition information is generally defined in accordance with the desired virtual printing dot for each given input density value.

Figure 5:
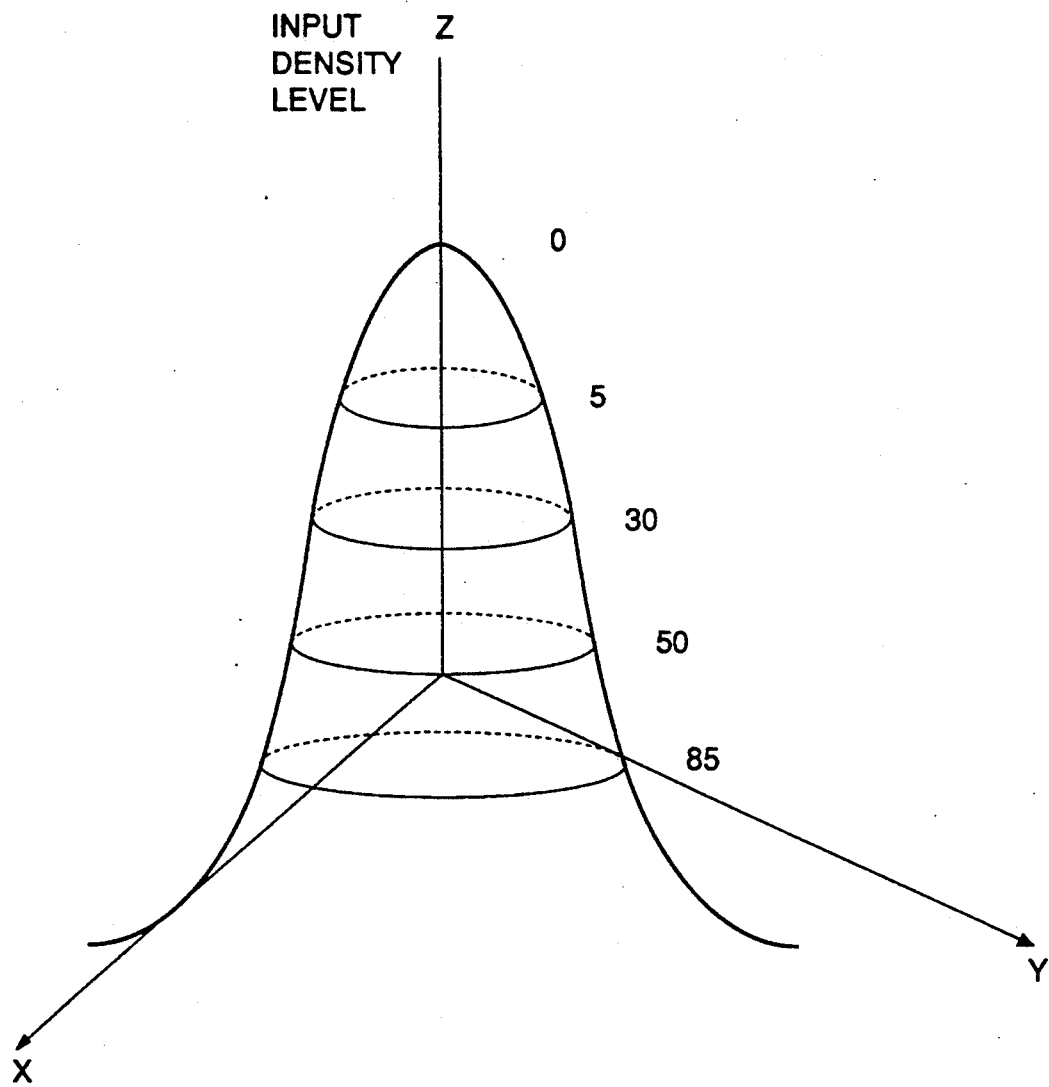
FIG. 5 is an illustration of the derivation of printing dots from a density distribution for a given printing dot configuration.

FIG. 5 illustrates a density distribution for a conventional C dot, which is used in process color printing. FIG. 5 shows various cross-sections of the density distribution for various corresponding input density values, the plurality of cross-sections defining the printing dot configuration.

Figure 6:
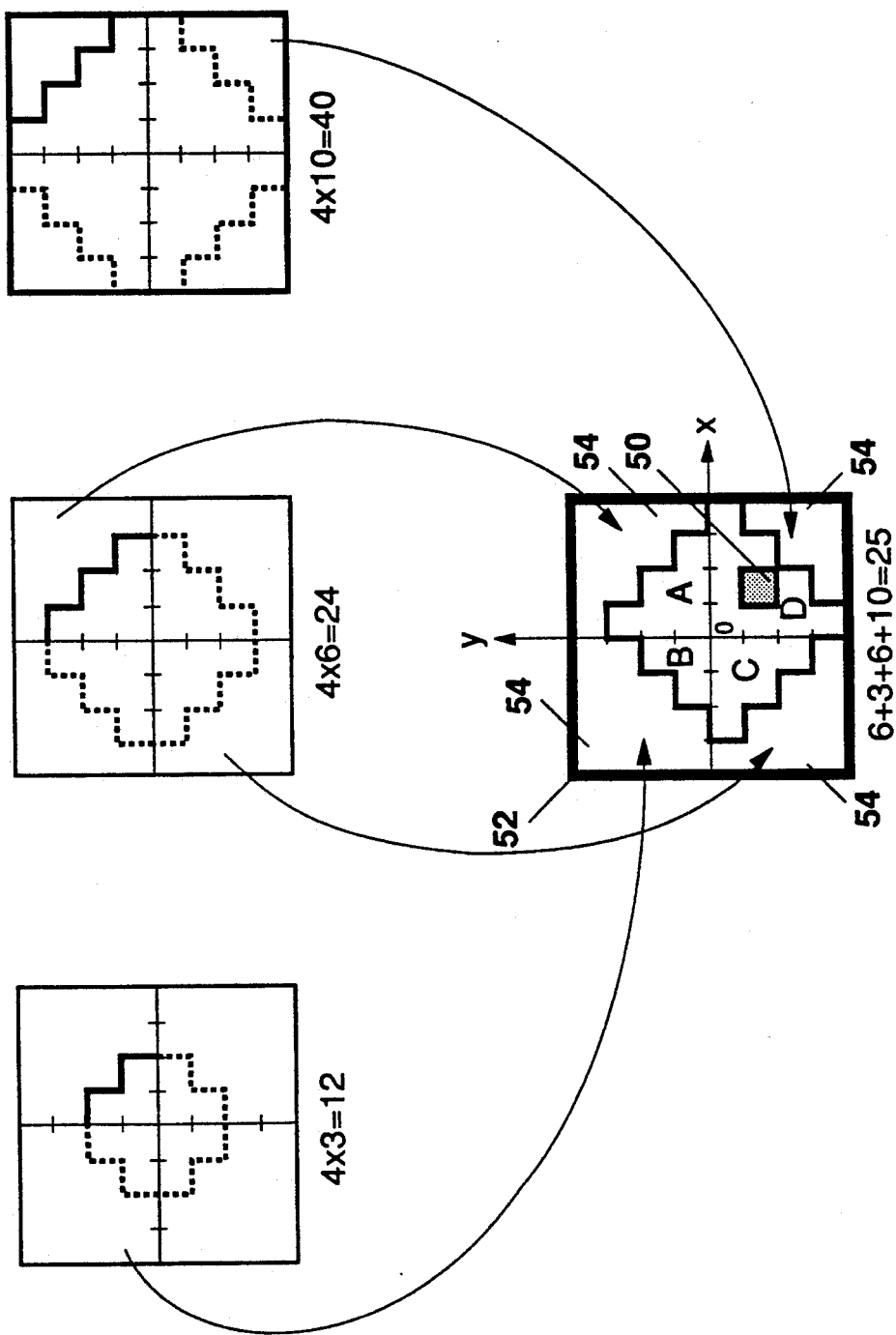
FIG. 6 is an illustration of the construction of a complete virtual printing dot for a given input density from a plurality of dot portions in accordance with a preferred embodiment of the invention.

Reference is now made to FIG. 6, which illustrates a typical virtual printing dot for a typical input density, here 99, which virtual printing dot can be expressed in dot unit count as 25, assuming a maximum dot unit count of 64. The virtual printing dot is built up of a multiplicity of dot units 50, each typically covering an area of 1/64 of the total maximum virtual printing dot area 52. The maximum virtual printing dot area 52 is preferably divided into a plurality of dot sections 54, here selected to be four in number. It is appreciated that a greater or lesser number of dot sections, as defined above, may be employed.

It is seen in FIG. 6 that each dot portion of which the virtual printing dot is constructed may also be employed in the construction of at least one other virtual printing dot having a different, sometimes, very different, dot unit count. Thus, for example, dot portions A and C may each form one quarter of a virtual printing dot which is symmetrical about the geometrical center of maximum virtual printing dot area 52 and has an dot unit count of 24, while dot portion B may form one quarter of a virtual printing dot which is symmetrical about the geometrical center of maximum virtual printing dot area 52 and has a dot unit count of 12 and dot portion D may form one quarter of a virtual printing dot which is symmetrical about the geometrical center of maximum virtual printing dot area 52 and has a dot unit count of 40.

In accordance with a preferred embodiment of the invention, the virtual printing dot configuration is stored in terms of inter-section distribution and intra-section composition information.

FIGS. 7A and 7B illustrate the contents of look-up tables containing inter-section distribution and intra-section composition information respectively for a virtual printing dot configuration, one virtual printing dot of which is illustrated in FIG. 6. It is noted that the most significant bit or bits of each of the x,y coordinates, preferably being the sign bits, identify to which dot section each dot unit belongs. The x,y coordinates may be virtual screen coordinates derived from u,v coordinates defining the beam position on a recording medium. The inter-section distribution information in the look-up table indicates how many dot units are contained in each dot portion for each number of dot units in a virtual printing dot.

The look-up table of FIG. 7B, containing intra-section composition information, indicates for each absolute value of the x coordinate and the y coordinate of a given location in a section, the minimum total number of dot units that the dot portion in that dot section must be composed of in order for the dot unit at that location to form a part of the dot portion.

For each input density, the actual number of dot units which make up each dot portion is given in the look-up table of FIG. 7A.

The screen processor 18 is operative inter alia to determine whether laser writing at each such u,v location should take place.

Figure 8A:
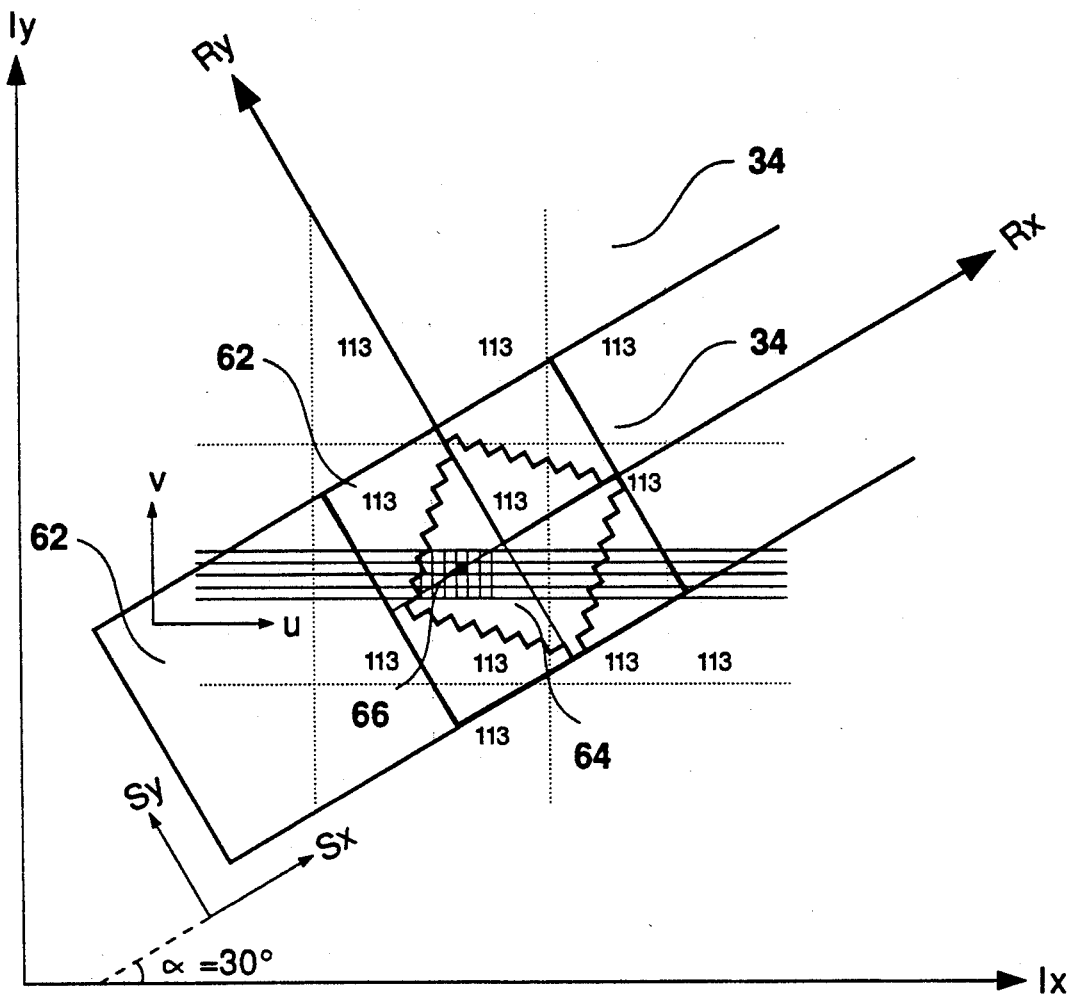
FIGS. 8A, 8B and 8C illustrate the construction of a printing dot using a laser plotter in accordance with the present invention.

Reference is now made to FIG. 8A, which illustrates the construction of a printing dot employing a rotated screen having a mesh different from the resolution of the scanner 10, for a portion 40 of the image illustrated in FIGS. 3 and 4. The input density values for the pixels 34 are indicated within each pixel and it is seen that they are all uniform.

The rotated screen defines a second multiplicity of cells 62, lying along coordinate axes $S_x$, $S_y$, which are rotated with respect to coordinate axes $I_x$, $I_y$ by a given angle, typically 30 degrees. Each printing dot 64 is located within a cell 62. The mesh of the rotated screen defines the size of cells 62 and provides printing dots having a typical spatial frequency of 60–200 per inch in the output image. The internal coordinates of each cell are given as $R_x$, $R_y$.

Each output dot 64 is made up of a third multiplicity of printing dot elements 66 which normally have a significantly higher resolution than pixels 34 and which are produced by laser plotter 26 (FIG. 1), which operates along coordinates u, v, which are normally parallel to coordinates $I_x$, $I_y$. Typical resolution of printing dot elements 66 is 800–5000 per inch of the output image.

Figure 8B:
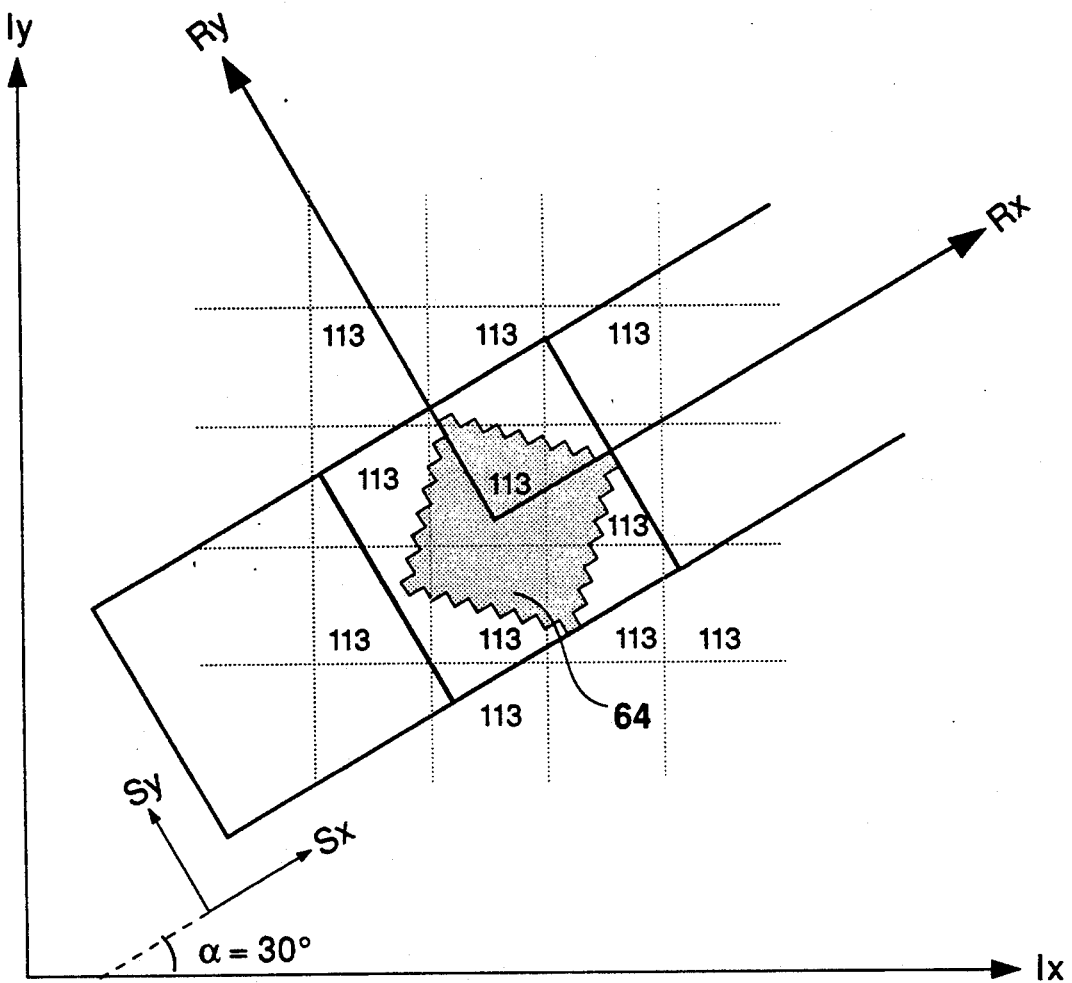

FIG. 8B illustrates a completed printing dot produced by the technique described above for the same location on the input image.

Figure 8C:
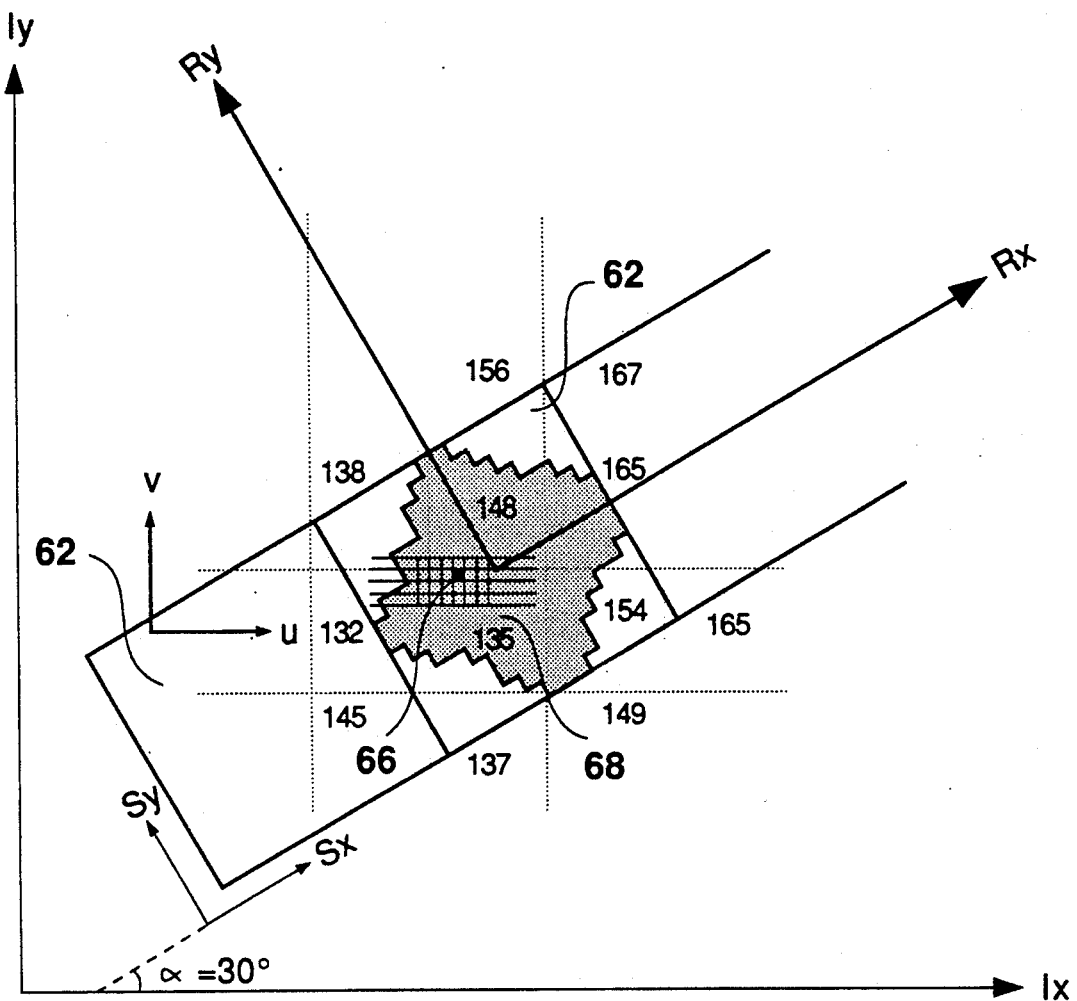

Reference is now made to FIG. 8C, which illustrates the construction of a printing dot employing a rotated screen having a mesh different from the resolution of the scanner 10, for a portion 42 of the image illustrated in FIGS. 3 and 4. The input density values for the pixels 34 are indicated within each pixel and it is seen that they differ from each other.

As in the example of FIGS. 8A and 8B, the rotated screen defines a second multiplicity of cells 62, lying along coordinate axes $S_x$, $S_y$, which are rotated with respect to coordinate axes $I_x$, $I_y$ by a given screen rotation angle typically 30 degrees. Each printing dot 68 is located within a cell 62. The mesh of the rotated screen defines the size of cells 62 and provides printing dots having a typical spatial frequency of 60–200 per inch in the output image. The internal coordinates of each cell are given as $R_x$, $R_y$.

It is appreciated from a consideration of FIG. 8C, that each part of the printing dot is a function of the input density value of the pixel 34 at the location at which that part lies. Thus where the input density value is relatively low, such as 132, the number of printing dot elements is generally relatively small and where the input density value is high, such as 165, the number of printing dot elements is generally relatively large. A printing dot which overlies pixels 34 having different input density values is thus configured in a manner generally corresponding to the arrangement of the input density values of the pixels 34 represented by the printing dot.

As in the example of FIGS. 8A and 8B, each output dot 68 is made up of a third multiplicity of printing dot elements 66 which normally have a significantly higher resolution than pixels 34 and which are produced by laser plotter 26 (FIG. 1), which operates along coordinates u, v, which are normally parallel to coordinates $I_x$, $I_y$. Typical resolution of printing dot elements 66 is 800–5000 per inch of the output image.

Figure 9:
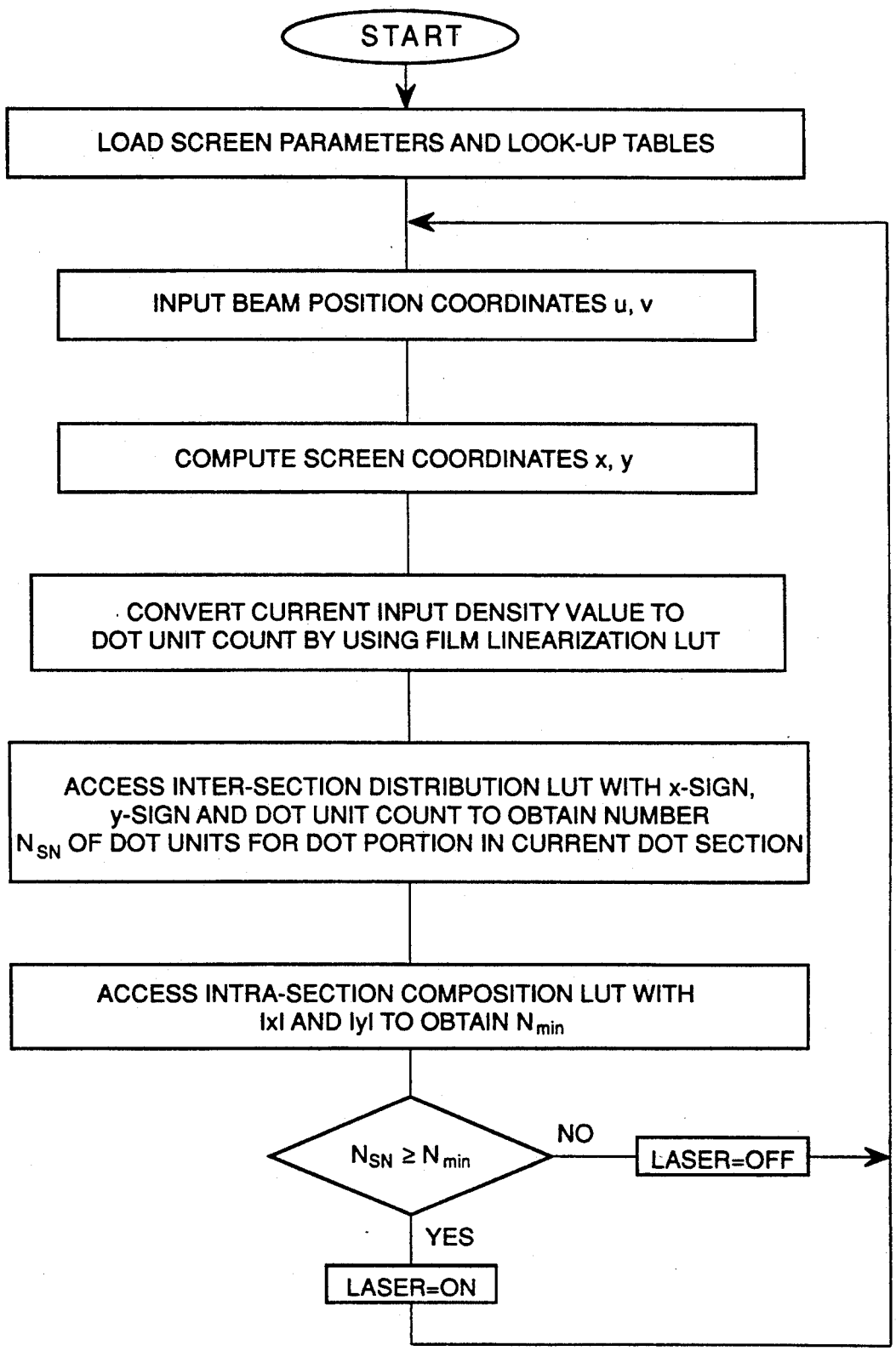
FIG. 9 is a detailed flowchart illustrating operation of the dot generation apparatus of the system of FIG. 1 using the virtual printing dot configuration information shown in FIGS. 7A and 7B in controlling the laser plotter to produce desired printing dots.
Figure 10:
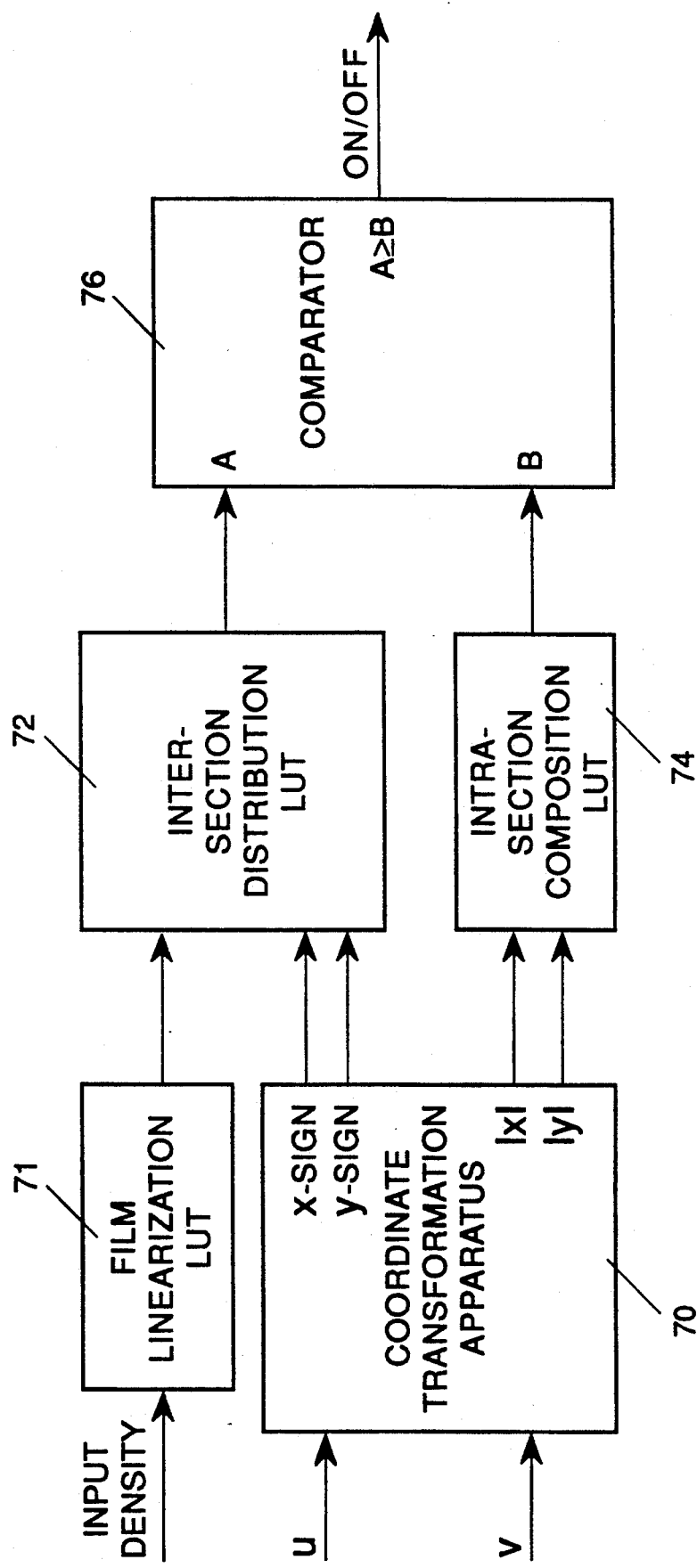
FIG. 10 is a block diagram illustration of a screen processor employed in the system of FIG. 1.

Reference is now made to FIG. 9, which is a flow chart illustrating the decision functions determining whether the laser plotter writes at a given location and to FIG. 10, which illustrates the screen processor 18.

Initially the screen parameters and the look-up tables are loaded into the system.

The input coordinates u,v of the laser beam position on the recording medium are supplied by the beam position indicator 27 (FIG. 1) to coordinate transformation apparatus 70 in the screen processor 18. The coordinate transformation apparatus 70 identifies the dot section 54 in the maximum virtual printing dot area 52 (FIG. 6) by means of x and y sign bits and also provides the corresponding screen coordinates represented by the absolute values of x and y within each dot section.

The input density value is received at a film linearization look-up table (LUT) 71 which converts that input density value to a dot unit count value indicating the number of dot units contained in the virtual printing dot that represents that input density value. The contents of LUT 71 generally take into account non-linearities exhibited by the recording material, notwithstanding that, for simplicity, a linear relationship has been assumed herein.

An inter-section distribution LUT 72 receives the dot unit count values from LUT 71 and also receives the x and y sign bits from coordinate transformation apparatus 70. The contents of LUTS 71 and 72 are preferably of the type illustrated in FIG. 7A, LUT 72 provides as an output, the total number of dot units that would make up the dot portion, were the same input density to be present over the entire given dot section.

An intra-section composition LUT 74 receives the absolute values of the x and y coordinates from coordinate transformation apparatus 70 and provides, for each set of absolute values of x and y coordinates, the minimum number of dot units that the dot portion used to represent the current input density in the given dot section must be composed of in order for the dot unit at that location to form part of the dot portion.

A comparator 76 receives the outputs of LUTS 72 and 74 and provides a laser write actuation output signal when the output of LUT 72 is greater than or equal to the output of LUT 74 for a given x,y coordinate pair. For every dot unit in a given dot section for which the total number of dot units contained in the corresponding dot portion that forms part of the virtual printing dot representing the current input density, is less than the number required for that dot unit to form part of that dot portion, the laser is not operated.

Figure 11:
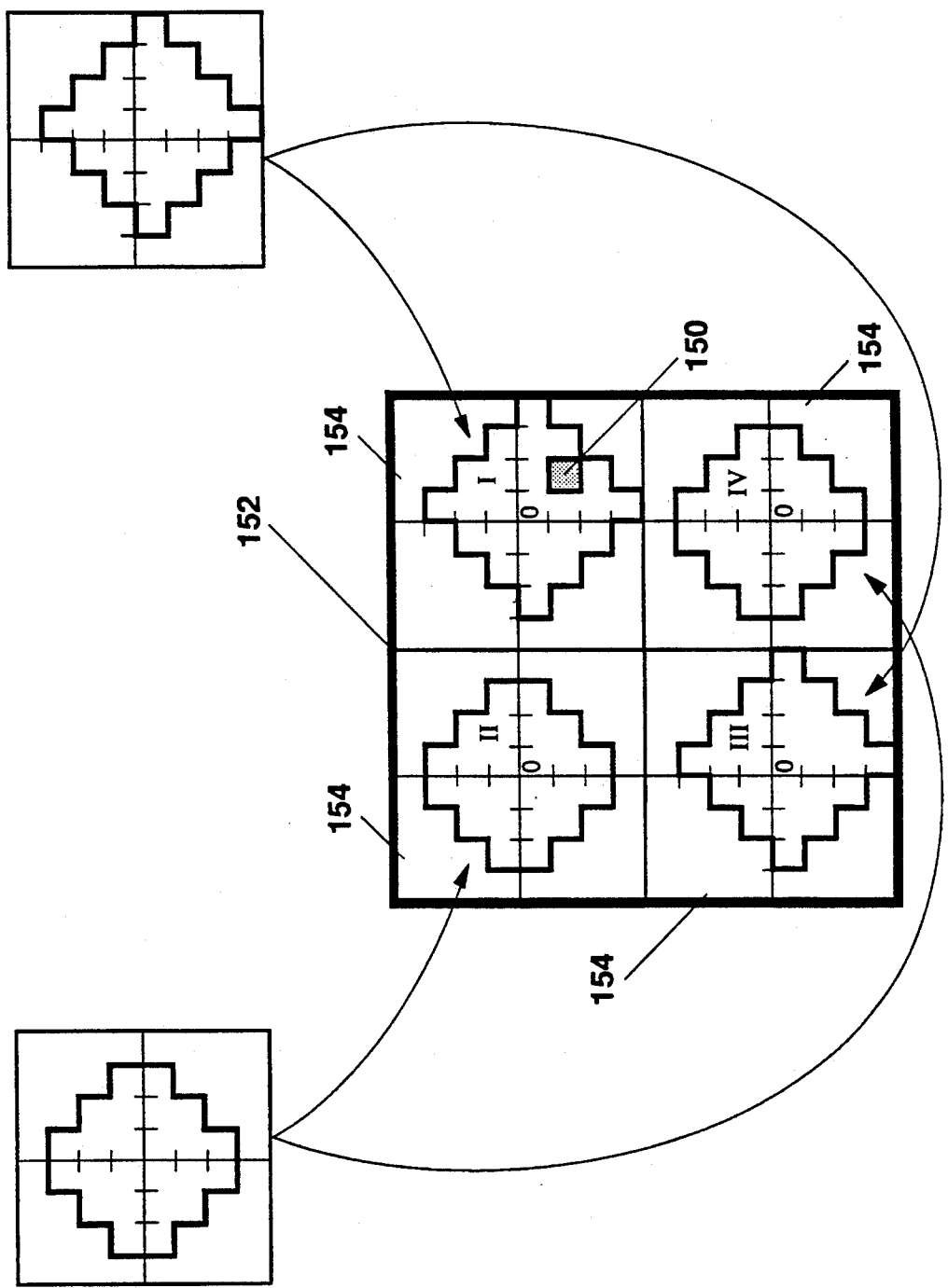
FIG. 11 is an illustration of the construction of a complete virtual printing superdot for a given input density from a plurality of superdot portions in accordance with another preferred embodiment of the invention.

Reference is now made to FIG. 11, which illustrates, for an alternative embodiment of the present invention, a typical virtual printing "superdot" for a typical input density, here 97. The virtual printing superdot can be expressed in dot unit count as 98, assuming a maximum dot unit count of 256. The superdot is built up of a multiplicity of dot units 150, each typically covering an area of 1/256 of the total maximum virtual printing superdot area 152. The area 152 is preferably divided into a plurality of superdot sections 154, here selected to be four in number. It is appreciated that a greater or lesser number of superdot sections, as defined above, may be employed.

In accordance with a preferred embodiment of the present invention, each superdot section 154 contains a complete virtual printing dot, as illustrated in FIG. 11, as opposed to a dot section containing a dot portion in the embodiment of FIG. 6.

It is a particular feature of the virtual printing superdot illustrated in FIG. 11 that it is formed of a plurality of non-mutually connected modular portions, at least one of which normally includes one or more dot units. In FIG. 11, each of the modular portions appears in the general configuration of a virtual printing dot, but this need not necessarily be the case. It is a feature of the apparatus and method of the present invention employing the virtual printing superdot of FIG. 11 that the whole virtual printing superdot is not stored in memory but rather only the various configurations of the modular portions thereof, or of modular portions of the modular portions thereof are stored.

The method of the present invention thus has the advantage that it provides an improved ratio of resolution in reproduced input density to information storage requirements as compared with conventional methods in which the whole virtual printing superdot would have to be stored, it being noted that the embodiment of FIG. 6 already provides an improved ratio of resolution of reproduced input density to information storage requirements as compared with the prior art, exemplified by U.S. Pat. No. 4,456,924. The embodiment of FIG. 6 also has other advantages over the prior art, including, for example, enhanced flexibility in the use of non-symmetric dot configurations.

It is appreciated that each of the modular portions may in fact correspond to a separate printing dot. In this view, the embodiment of FIG. 11 enables representation of an input density which is uniform over an area covering multiple printing dots to a degree of resolution which otherwise cannot be attained by conventional repetition of a given such printing dot.

For example, whereas a printing dot has a minimum size in order to be printable, corresponding, for example to two dot units, a lower input density value can be represented by a group of four modular portions, two of which include virtual printing dots containing two dot units and two of which are blank. Similarly uniform input density values which cannot accurately be represented by the repetition of a given printing dot may be represented by intermittently increasing and decreasing the printing dot element count of a plurality of adjacent printing dots.

FIG. 12 illustrates the contents of a look-up table containing superdot inter-section distribution information and corresponding generally to the look-up table appearing in FIG. 7A. Thus the look-up table of FIG. 12 provides for each range of input densities, the number of dot units that are used to make up the virtual printing superdot and their distribution among the four modular portions making up the virtual printing superdot. For simplicity, modular portions I and III are assumed to be identical, while modular portions II and IV are assumed to be identical, although this need not necessarily be the case.

As will be described hereinbelow, the configuration of each of the modular portions is preferably determined using the look-up tables of FIGS. 7A and 7B, wherein virtual printing dot corresponds to a modular portion. Reference is made in this connection to the foregoing discussion of FIGS. 7A and 7B.

As in the embodiment of FIG. 10, the screen processor 18 is operative inter alia to determine whether laser writing at each such u,v location should take place.

Figure 13A:
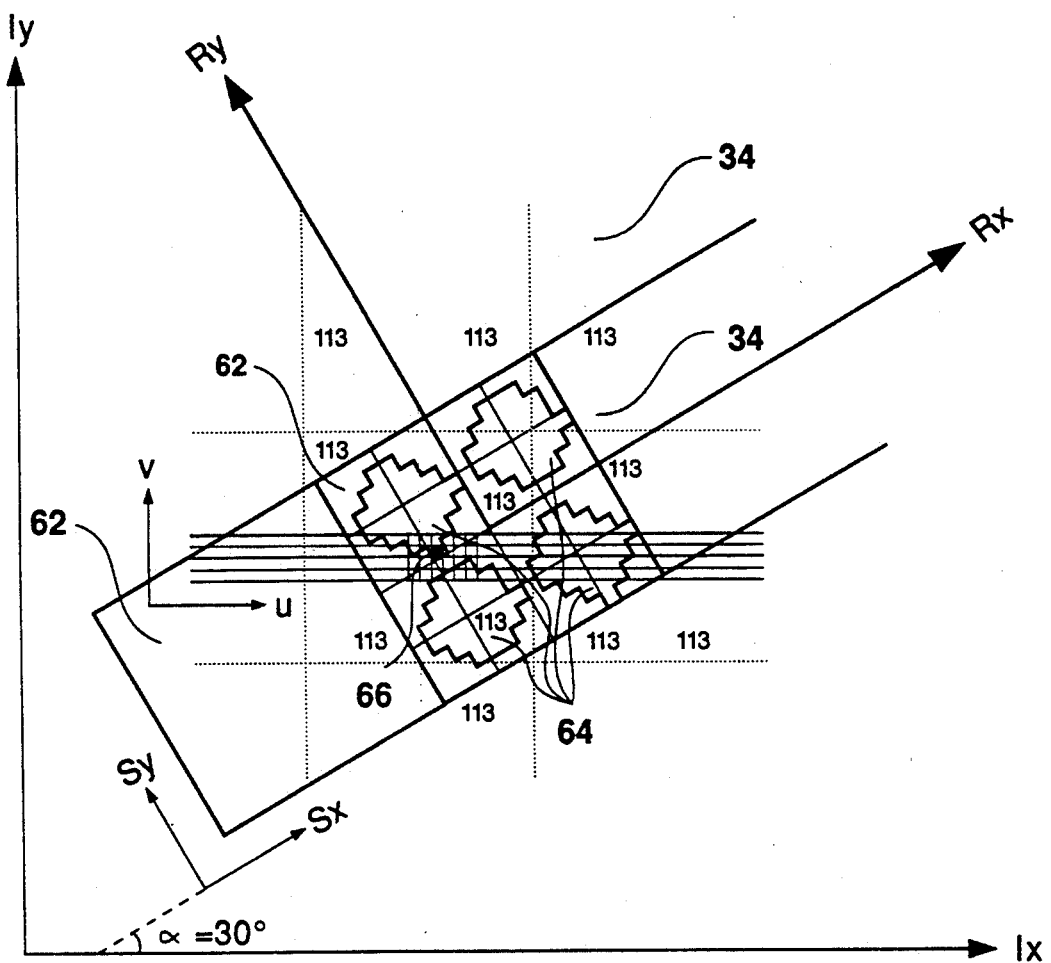
FIGS. 13A, 13B and 13C illustrate the construction of a printing superdot using a laser plotter in accordance with the present invention.

Reference is now made to FIG. 13A, which illustrates the construction of a printing superdot of the general type illustrated in FIG. 11. Here a rotated screen is employed having a mesh which is two times finer than that illustrated in FIG. 8A.

Figure 13B:
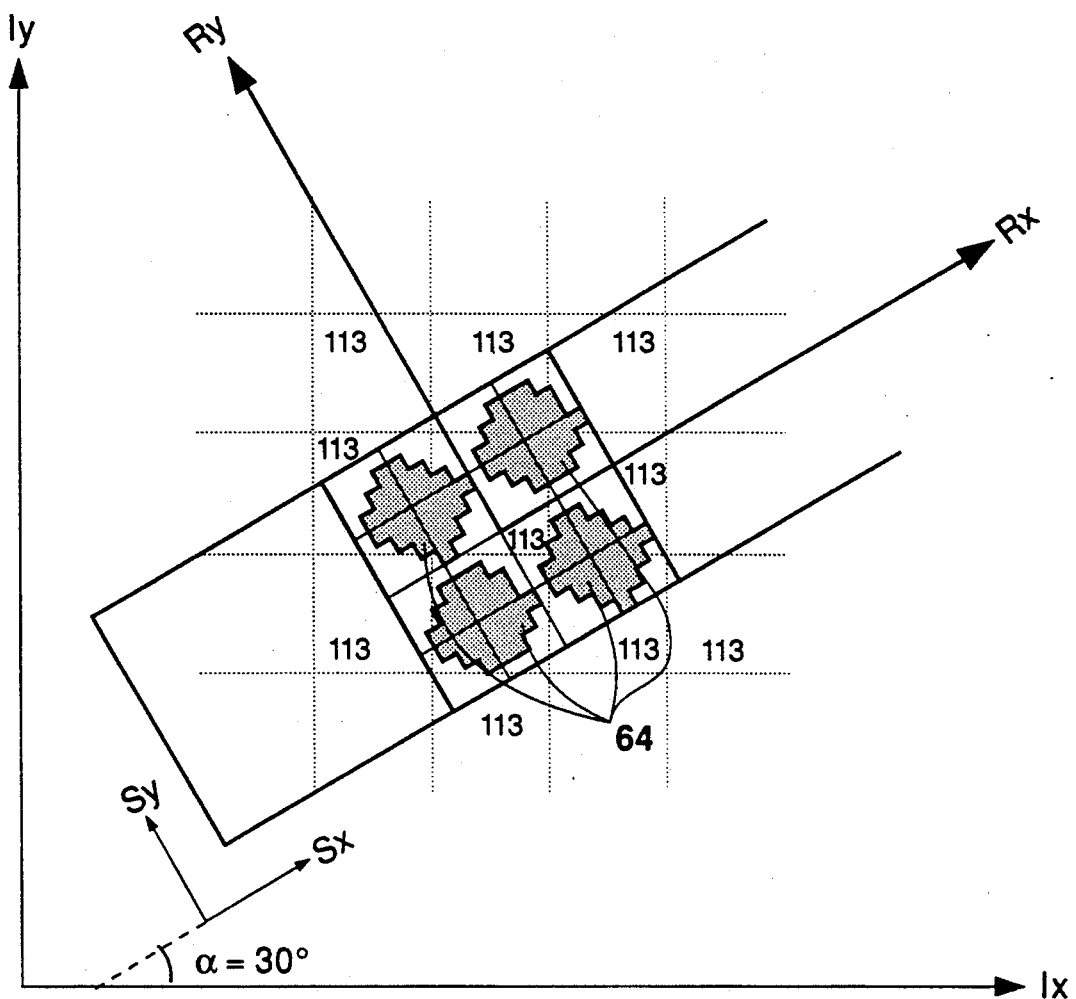

FIG. 13B illustrates a completed printing superdot produced by the technique described above for the same location on the input image.

Figure 13C:
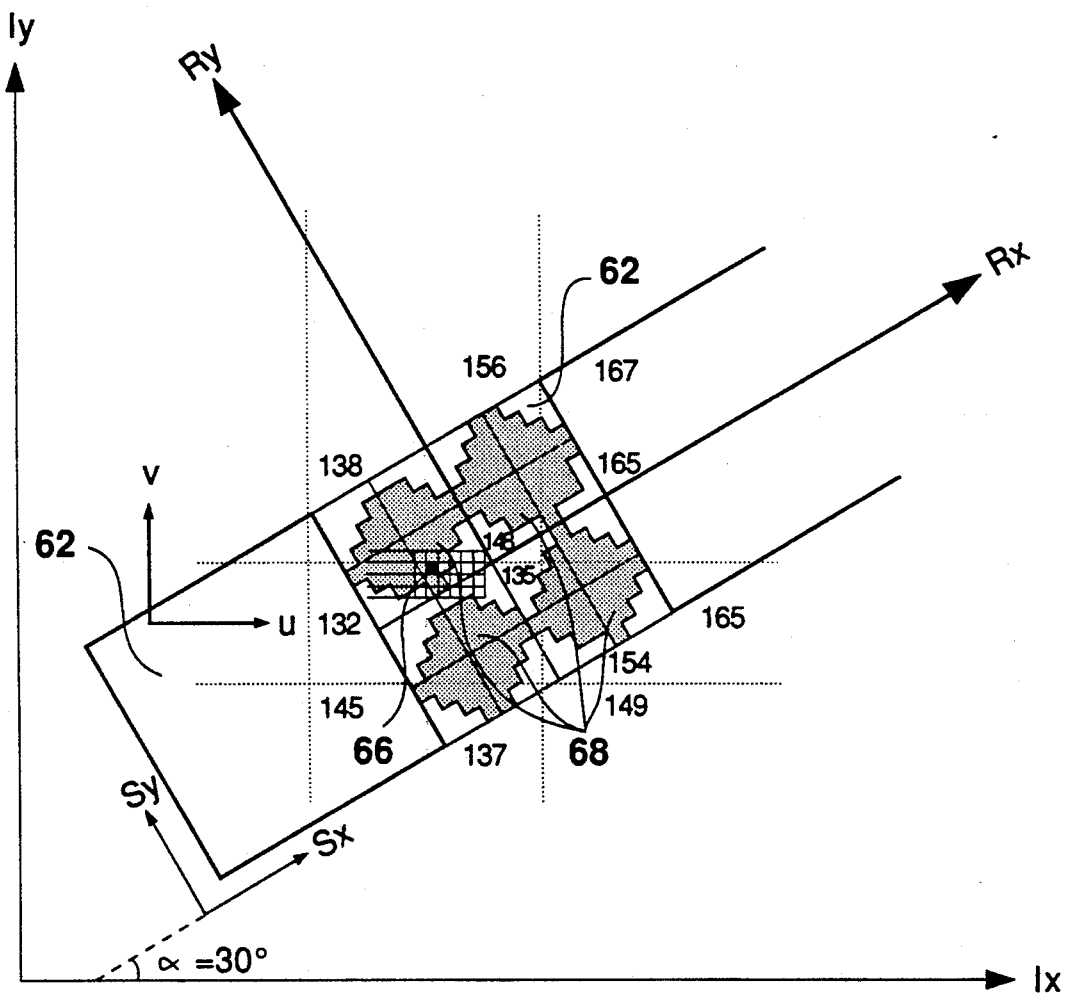

Reference is now made to FIG. 13C, which illustrates the use of a printing superdot in an environment where the input density value is non-uniform. The input density values for the pixels 34 are indicated within each pixel and it is seen that they differ from each other.

It is appreciated from a consideration of FIG. 13C, that each part of the printing superdot is a function of the input density value of the pixel 34 at the location at which that part lies. Thus where the input density value is relatively low, such as 132, the number of printing dot elements is generally relatively small and where the input density value is high, such as 165, the number of printing dot elements is generally relatively large. Printing dots which overlie pixels 34 having different input density values are thus configured in a manner generally corresponding to the arrangement of the input density values of the pixels 34 represented by the printing dots.

Figure 14:
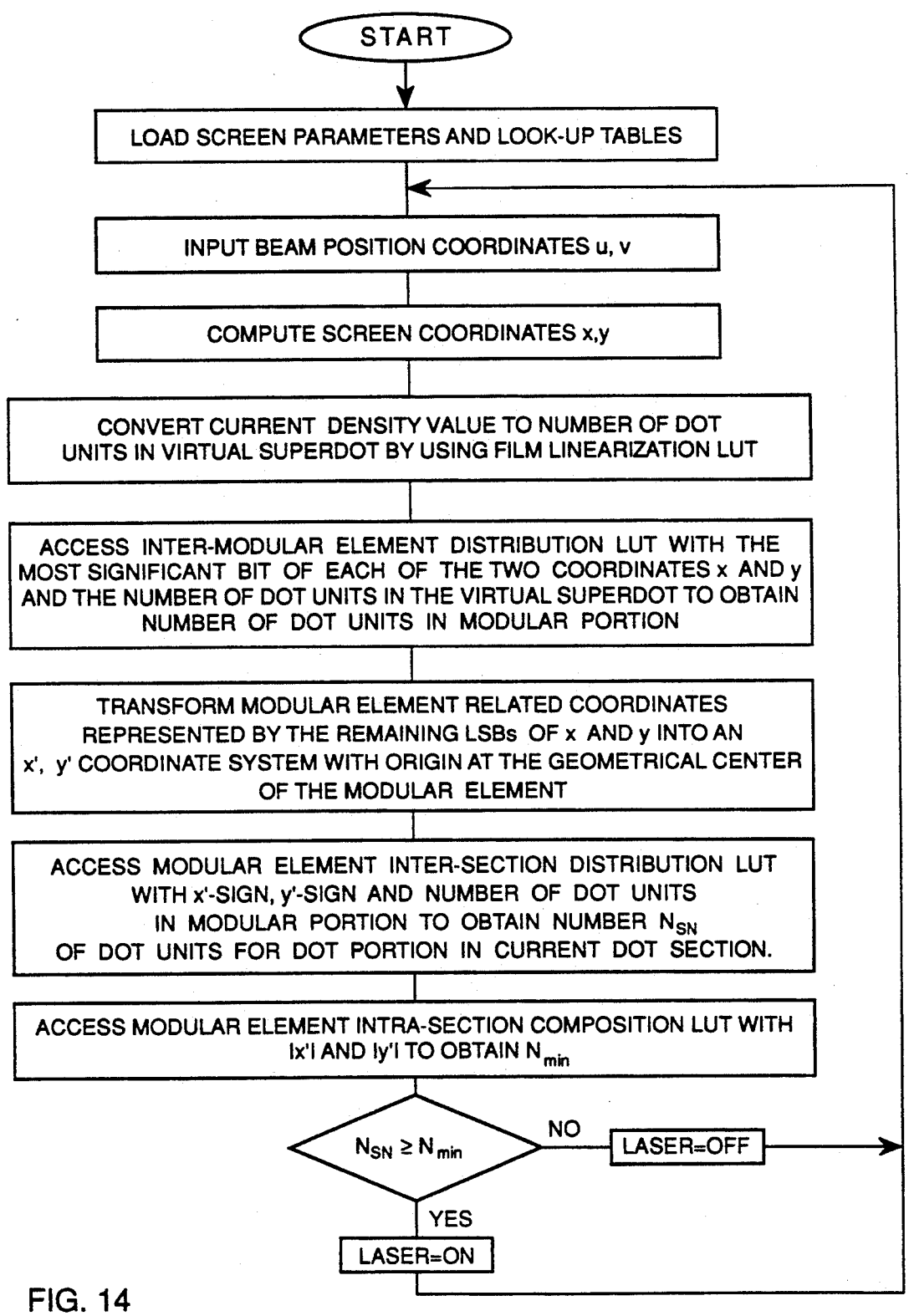
FIG. 14 is a detailed flowchart illustrating operation of the dot generation apparatus of the system of FIG. 1 using the virtual printing superdot configuration information shown in FIG. 12 in controlling the laser plotter to produce desired printing dots.
Figure 15:
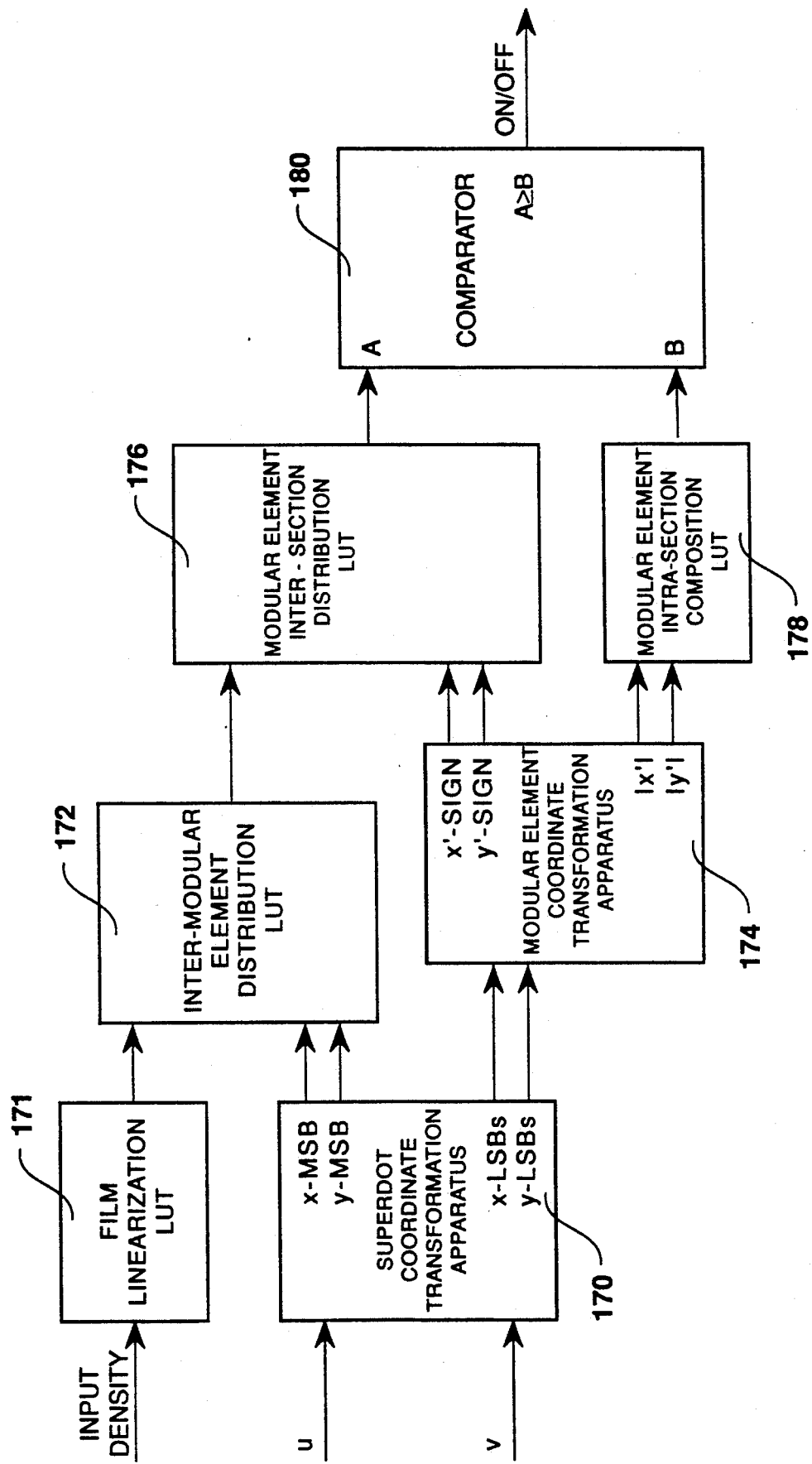
FIG. 15 is a block diagram illustration of an alternative embodiment of a screen processor employed in the system of FIG. 1 for producing printing superdots of the type illustrated in FIGS. 10, 13A, 13B and 13C.

Reference is now made to FIG. 14, which is a flow chart illustrating the decision functions determining whether the laser plotter writes at a given location 66 and to FIG. 15, which illustrates the screen processor 18 for the embodiment of the invention employing superdots.

Initially the screen parameters and the look-up tables are loaded into the system.

The input coordinates u,v of the laser beam position on the recording medium are supplied by the beam position indicator 27 (FIG. 1) to superdot coordinate transformation apparatus 170 in the screen processor 18. The coordinate transformation apparatus 170 identifies the superdot section 154 in the maximum virtual printing superdot area 152 (FIG. 11) by means of most significant x and y bits and also provides information relating to coordinates in the superdot sections by means of least significant x and y bits.

The input density value is received at a film linearization look-up table (LUT) 171 which converts input density values to dot unit count values indicating the number of dot units contained in each virtual printing superdot. The contents of LUT 171 generally take into account non-linearities exhibited by the recording material, notwithstanding that, for simplicity, a linear relationship has been assumed herein.

An inter-modular element distribution LUT 172 receives the dot unit count values from LUT 171 and also receives the most significant x and y bits from coordinate transformation apparatus 170. The contents of LUTS 171 and 172 are preferably of the type illustrated in FIG. 12. LUT 172 provides as an output, the total number of dot units that would be contained in the modular portion, were the same input density to be present over the entire superdot section.

Modular element coordinate transformation apparatus 174 receives the least significant bits of the x and y coordinates from superdot coordinate transformation apparatus 170 and provides, for each set of least significant bits of x and y coordinates, coordinates in a system (x',y') centered at the geometrical center of each modular element or superdot section. Apparatus 174 provides x' and y' sign bits and the absolute values of the x' and y' coordinates.

Modular element intra-section composition LUT 178 receives the absolute values of the x' and y' coordinates, while modular element inter-section distribution LUT 176 receives the x' and y' sign bits. The operations of LUTS 178 and 176 correspond to those of respective LUTS 74 and 72, described hereinabove in connection with FIG. 10. Accordingly, the operation of comparator 180 corresponds to that of comparator 76 in the embodiment of FIG. 10.

Figure 16:
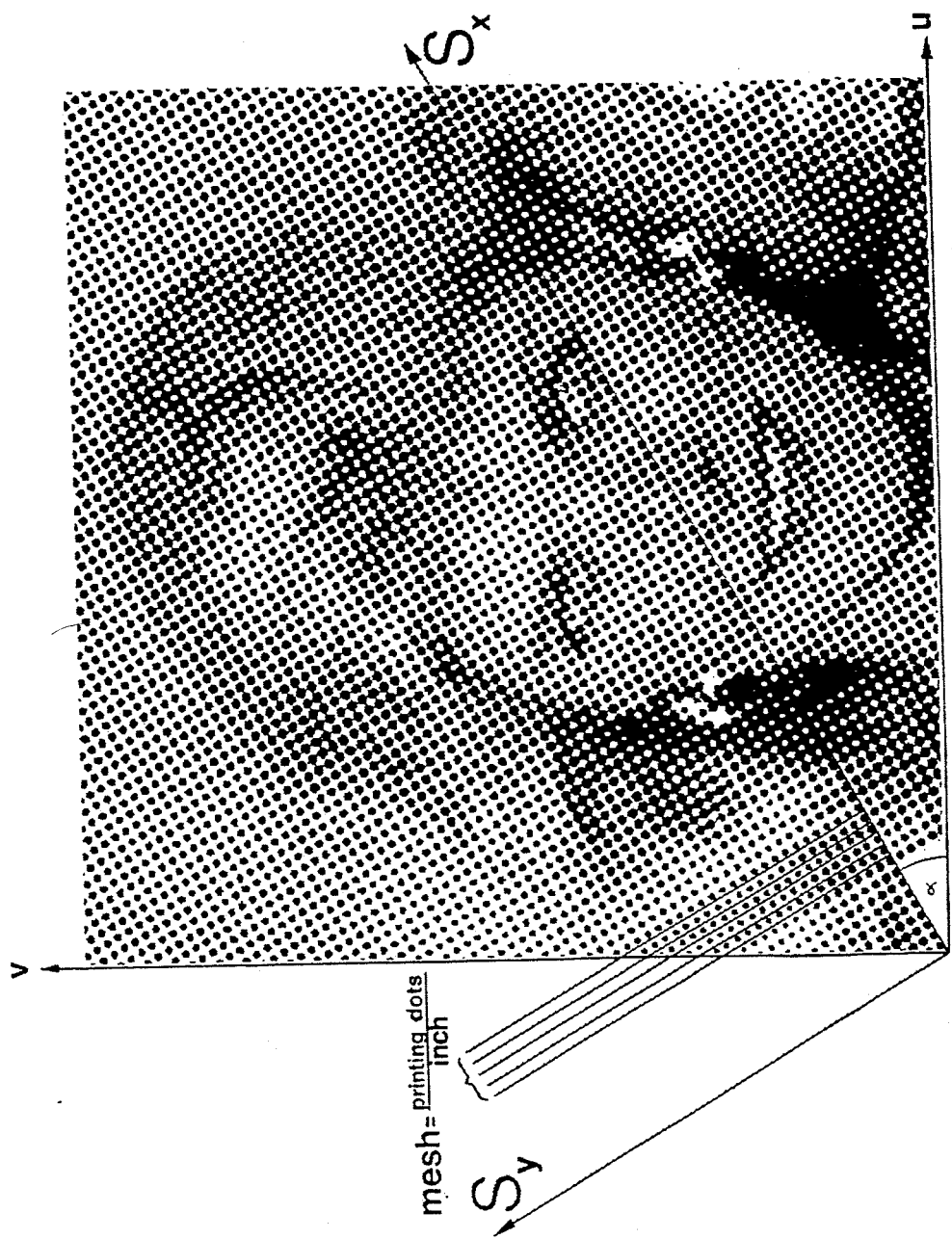
FIG. 16 is an output screened image produced according to the present invention.

FIG. 16 illustrates a screened halftone color separation produced in accordance with a preferred embodiment of the present invention. It is appreciated that the operator, using workstation 16, defines the screen rotation angle α and the mesh of the output screen dots.

It will be appreciated by persons skilled in the art that the present invention is not limited by what has been particularly shown and described hereinabove. Rather the scope of the present invention is defined only by the claims which follow:

I claim:

1. A technique for generating a screened reproduction of an image comprising the steps of:
   providing a representation of an original containing information representing the input density values of the original;

storing information representing a part of at least one printing dot; and exposing a recording medium to record the image by using the stored information to compose complete printing dots depending on the input densities of the representation at the locations of the printing dots, wherein said step of storing includes storing information in a first look-up table which comprises representations of a plurality of dot units making up a dot section, wherein each representation of a dot unit is assigned an identification code used for indicating whether that particular dot unit will correspond to a printing dot element.

2. A technique according to claim 1 and wherein said identification code indicates the smallest number of dot units which must be contained in a chosen dot portion in order for that particular dot unit to form part of that dot portion.

3. A technique according to claim 1 and wherein said step of exposing comprises:

supplying area location information to the first look-up table and to a second look-up table, wherein the second look-up table receives a portion of the area location information which identifies a given dot section location as well as input density information and provides an output indicating the total number of dot units that would be contained in the corresponding dot portion, were the same input density to be present over the entire dot section and the first look-up table receives a portion of the area location information which indicates the location of a dot unit in the dot section and provides the identification code of the corresponding dot unit;

supplying the outputs of the first and second look-up tables to a comparator which indicates for each dot unit whether that dot unit is included in the total number of dot units forming the dot portion; and exposing only printing dot elements which correspond to the dot units forming the dot portion.

4. A technique according to claim 1 and wherein each said dot unit corresponds to a single potential printing dot element.

5. A technique according to claim 1 and wherein each said dot unit corresponds to a plurality of potential printing dot element.

6. A technique according to claim 1 and wherein any number of said dot units may correspond to any number of potential printing dot elements.

7. A technique according to claim 1 and wherein said printing dot for a relatively higher input density does not always include all of the printing dot elements of a printing dot for a relatively lower input density.

8. A technique according to claim 3 and wherein said printing dot for a relatively higher input density does not always include all of the printing dot elements of a printing dot for a relatively lower input density.

9. A technique for generating a screened reproduction of an image comprising the steps of:

providing a representation of an original containing information representing the input density values of the original;

storing information representing a part of at least one printing dot; and exposing a recording medium to record the image by using the stored information to compose complete printing dots depending on the input densities of the representation at the locations of the printing dots, wherein said step of storing comprises the provision of a look-up table containing, for each combination of a given dot section location and a given input density, information relating to the total number of dot units that would be contained in the corresponding dot section, with the same input density present over the entire dot section.

10. A technique for generating a screened reproduction of an image comprising the steps of:

providing a representation of an original containing information representing the input density values of the original;

storing information representing a part of at least one printing dot; and exposing a recording medium to record the image by using the stored information to compose complete printing dots depending on the input densities of the representation at the locations of the printing dots, wherein said step of exposing comprises:

supplying to a look-up table area location information identifying a given dot section location, as well as corresponding input density information and providing an output from the look-up table relating to the total number of dot units that are included in a dot portion;

using the output of the look-up table and information relating to the location of a dot unit in the dot section to indicate for each dot unit whether that dot unit is included in the total number of dot units forming the dot portion; and exposing only those printing dot elements which correspond to the dot units in the dot portion.

11. A technique for generating a screened reproduction of an image comprising the steps of:

providing a representation of an original containing information representing the input density values of the original;

storing information representing a part of at least one printing dot; and exposing a recording medium to record the image by using the stored information to compose complete printing dots depending on the input densities of the representation at the locations of the printing dots, wherein said printing dot comprises multiple dots.

12. A technique for generating a screened reproduction of an image comprising the steps of:

providing a representation of an original containing information representing the input density values of the original;

storing information representing a part of at least one printing dot; and exposing a recording medium to record the image by using the stored information to compose complete printing dots depending on the input densities of the representation at the locations of the printing dots.

13. A technique according to claim 12 and wherein said step of storing comprises storing of only parts of each of such multiple areas.

14. A technique according to claim 12 and wherein said multiple areas are mutually non-contacting.

15. Apparatus for generating a screened reproduction of an image comprising:

means for providing a representation of an original containing information representing the input density values of the original;

means for storing information representing a part of at least one printing dot; and means for exposing a recording medium to record the image by using the stored information to compose complete printing dots depending on the input densities of the representation at the locations of the printing dots, wherein said means for storing includes means for storing information in a first look-up table which comprises representations of a plurality of dot units making up a dot section, wherein each representation of a dot unit is assigned an identification code used for indicating whether that particular dot unit will correspond to a printing dot element.

16. Apparatus according to claim 15 and wherein said identification code indicates the smallest number of dot units which must be contained in a chosen dot portion in order for that particular dot unit to form part of that dot portion.

17. Apparatus according to claim 15 and wherein said means for exposing comprises:

means for supplying area location information to the first look-up table and to a second look-up table, wherein the second look-up table receives a portion of the area location information which identifies a given dot section location as well as input density information and provides an output indicating the total number of dot units that would be contained in the corresponding dot portion, were the same input density to be present over the entire dot section and the first look-up table receives a portion of the area location information which indicates the location of a dot unit in the dot section and provides the identification code of the corresponding dot unit;

means for supplying the outputs of the first and second look-up tables to a comparator which indicates for each dot unit whether that dot unit is included in the total number of dot units forming the dot portion; and means for exposing only printing dot elements which correspond to the dot units forming the dot portion.

18. Apparatus according to claim 16 and wherein each said dot unit corresponds to a single potential printing dot element.

19. Apparatus according to claim 16 and wherein each said dot unit corresponds to a plurality of potential printing dot elements.

20. Apparatus according to claim 16 and wherein any number of said dot units may correspond to any number of potential printing dot elements.

21. Apparatus according to claim 16 and wherein said printing dot for a relatively higher input density does not always include all of the printing dot elements of a printing dot for a relatively lower input density.

22. Apparatus according to claim 21 and wherein said means for storing information comprises information relating to a plurality of selectable different printing dot configurations.

23. Apparatus for generating a screened reproduction of an image comprising:

means for providing a representation of an original containing information representing the input density values of the original;

means for storing information representing a part of at least one printing dot; and means for exposing a recording medium to record the image by using the stored information to compose complete printing dots depending on the input densities of the representation at the locations of the printing dots, wherein said means for storing comprises a look-up table containing, for each combination of a given dot section location and a given input density, information relating to the total number of dot units that would be contained in the corresponding dot section, with the same input density present over the entire dot section.

24. Apparatus according to claim 23 and wherein said printing dot for a relatively higher input density does not always include all of the printing dot elements of a printing dot for a relatively lower input density.

25. Apparatus for generating a screened reproduction of an image comprising:

means for providing a representation of an original containing information representing the input density values of the original;

means for storing information representing a part of at least one printing dot; and means for exposing a recording medium to record the image by using the stored information to compose complete printing dots depending on the input densities of the representation at the locations of the printing dots, wherein said means for exposing comprises:

means for supplying to a look-up table area location information identifying a given dot section location, as well as corresponding input density information and providing an output from the look-up table relating to the total number of dot units that are included in a dot portion;

means for using the output of the look-up table and information relating to the location of a dot unit in the dot section to indicate for each dot unit whether that dot unit is included in the total number of dot units forming the dot portion; and means for exposing only those printing dot elements which correspond to the dot units in the dot portion.

26. Apparatus for generating a screened reproduction of an image comprising:

means for providing a representation of an original containing information representing the input density values of the original;

means for storing information representing a part of at least one printing dot; and means for exposing a recording medium to record the image by using the stored information to compose complete printing dots depending on the input densities of the representation at the locations of the printing dots, wherein said printing dot comprises multiple areas, and wherein said means for storing comprises means for storing of only parts of each of such multiple areas.

27. Apparatus for generating a screened reproduction of an image comprising:

means for providing a representation of an original containing information representing the input density values of the original;

means for storing information representing a part of at least one printing dot; and means for exposing a recording medium to record the image by using the stored information to compose complete printing dots depending on the input densities of the representation at the locations of the printing dots, wherein said printing dot comprises multiple areas, and wherein said multiple areas are mutually non-contacting.

28. Apparatus for generating a screened reproduction of an image comprising:

means for providing a representation of an original containing information representing the input density values of the original;

means for storing information representing a part of at least one printing dot; and means for exposing a recording medium to record the image by using the stored information to compose complete printing dots depending on the input densities of the representation at the locations of the printing dots, wherein said means for storing includes means for storing information representing less than complete printing dots, wherein said means for providing a representation comprises a laser scanner having a first pixel resolution, and wherein said printing dots which are arranged in a printing dot grid having a second resolution, coarser than the first pixel resolution.

29. Apparatus according to claim 28 and wherein said representation of the original is arranged in a scanner grid pattern and said scanner grid is angled with respect to said printing dot grid.

* * * * *